US012663255B2

(12) United States Patent
Howell et al.

(10) Patent No.: US 12,663,255 B2
(45) Date of Patent: Jun. 23, 2026

(54) SUPER INTERFEROMETRIC RANGE RESOLUTION

(71) Applicant: Chapman University, Orange, CA (US)

(72) Inventors: John Howell, Orange, CA (US); Andrew Jordan, Orange, CA (US)

(73) Assignee: Chapman Unviersity, Orange, CA (US)

( * ) Notice: Subject to any disclaimer, the term of this patent is extended or adjusted under 35 U.S.C. 154(b) by 194 days.

(21) Appl. No.: 18/742,410

(22) Filed: Jun. 13, 2024

(65) Prior Publication Data

US 2024/0418498 A1 Dec. 19, 2024

Related U.S. Application Data

(60) Provisional application No. 63/521,259, filed on Jun. 15, 2023.

(51) Int. Cl.
G01B 9/0209 (2022.01)
G01S 17/08 (2006.01)

(52) U.S. Cl.
CPC ............ G01B 9/0209 (2013.01); G01S 17/08 (2013.01)

(58) Field of Classification Search
CPC .............................. G01B 9/0209; G01S 17/08
See application file for complete search history.

(56) References Cited

U.S. PATENT DOCUMENTS

| | | | | |
|---|---|---|---|---|
| 2011/0248882 A1* | 10/2011 | Coppi | ..................... | G01S 13/34 |
| | | | | 342/156 |
| 2012/0112953 A1* | 5/2012 | Grau Besoli | ........... | G01S 13/87 |
| | | | | 342/146 |
| 2019/0204416 A1* | 7/2019 | Yanagi | .................... | G01S 7/043 |

* cited by examiner

*Primary Examiner* — Kara E. Geisel
*Assistant Examiner* — Jarreas Underwood
(74) *Attorney, Agent, or Firm* — K&L Gates LLP; Brian J. Novak; Dennis A. Majewski

(57) ABSTRACT

Disclosed herein is an interferometric range resolution apparatus comprising: an antenna and a transceiver configured to transmit and receive wireless pulses; a dish configured to direct the received wireless pulses to the antenna; and a processor electrically coupled to the antenna via the transceiver, the processor configured to provide range resolution of at least two objects along a same line-of-sight of the transmitted wireless pulses.

18 Claims, 11 Drawing Sheets

SUPER INTERFEROMETRIC RANGE RESOLUTION

PRIORITY CLAIM

This application claims priority to and the benefit of U.S. Provisional Patent Application No. 63/521,259, filed Jun. 15, 2023, the entire contents of which are hereby incorporated by reference and relied upon.

BACKGROUND

Range resolved interferometry ("RRI") is an interferometric signal processing technique that allows the precise estimation of the separation of relative target distance from their superimposed waveforms in the return signal, even when that distance is much less than the inverse bandwidth of the sent waveform. Remote sensing often has range resolution limits. In some instances, it is desirable to use long wavelength waves to resolve features of a target that are many times smaller than the shortest wave component of a pulse.

SUMMARY

The present disclosure provides new and innovative, systems, methods, apparatus, and techniques for performing and/or providing interferometric range resolution. In an example, a system or apparatus for interferometric range resolution includes an antenna and a transceiver configured to transmit and receive wireless pulses, a dish, and a processor. The dish may be configured to direct the received wireless pulses to the antenna, and the processor may be electrically coupled to the antenna via the transceiver. In an example, the processor is configured to provide range resolution of at least two objects along a same line-of-sight of the transmitted wireless pulses by: selecting interference-class pulses for transmission. In an example, the interference-class pulse may be formed using a function. The processor may further cause the antenna to transmit the interference-class pulses as the wireless pulses, and once the reflected wireless pulses are received via the antenna, the processor may be configured to use parameter estimation of the reflected wireless pulses to determine at least one of a range of the at least two objects, a distance between the at least two objects, or relative scattering amplitudes related to the at least two objects.

BRIEF DESCRIPTION OF THE DRAWINGS

The following figures are included to illustrate certain aspects of the present disclosure and should not be viewed as exclusive embodiments. The description will be more fully understood with reference to the following figures, which are presented as exemplary embodiments of the invention and should not be construed as a complete recitation of the scope of the invention. The subject matter disclosed is capable of considerable modifications, alterations, combinations, and equivalents in form and function, as will occur to one having ordinary skill in the art and having the benefit of this disclosure.

US 12,663,255 B2

3
DETAILED DESCRIPTION

Range resolution is the ability to determine the distance between two objects along the same line-of-sight when performing remote sensing. Radar range resolution may be inextricably linked to the inverse bandwidth of a pulse or to the wavelength of the electromagnetic wave owing to the coherent nature of the interfering wavefronts. In an example, wave theory indicates that the best vertical resolution that can be achieved may be one-quarter of the dominant wavelength. Within that vertical distance reflections will interfere in a constructive manner and result in a single, observed reflection. The desire for better range resolution has coincided with the pursuit of ever-higher frequencies of radar and lidar. However, the use of high frequencies comes at a severe cost because transmission through and reflection from various material media is critically tied to frequency. The systems, methods, and techniques of the present disclosure dramatically improves upon these widely accepted limits of range resolution using a novel class of self-referenced functions to demonstrate several orders of magnitude improvement in range resolution beyond known limits.

For transform-limited pulses, two radar targets are considered range-resolved when the range resolution distance $d_r$ obeys the inequality from Equation 1 below:

$$d_r \geq \frac{c\tau}{2} \qquad \text{(Equation 1)}$$

Where c is the speed of light, T is the pulse width and 2 represents the round trip of the pulse. Phase or frequency encoding may be employed to realize high time-bandwidth product pulses, which when combined with match-filtered pulse compression, lead to high temporal resolution. Therefore, a more general range resolution for a pulse is set by the inverse bandwidth. Going beyond these limits has been historically difficult. Some techniques to reduce ranging uncertainty include the use of super-oscillations, which has been shown to reduce ranging uncertainty by 36 percent. Other techniques have used partially coherent radar in an attempt to decouple range resolution from the signal bandwidth and have achieved improvements by a factor of ten. Existing techniques results in a "temporally resolved" paradigm.

Figure 1A:
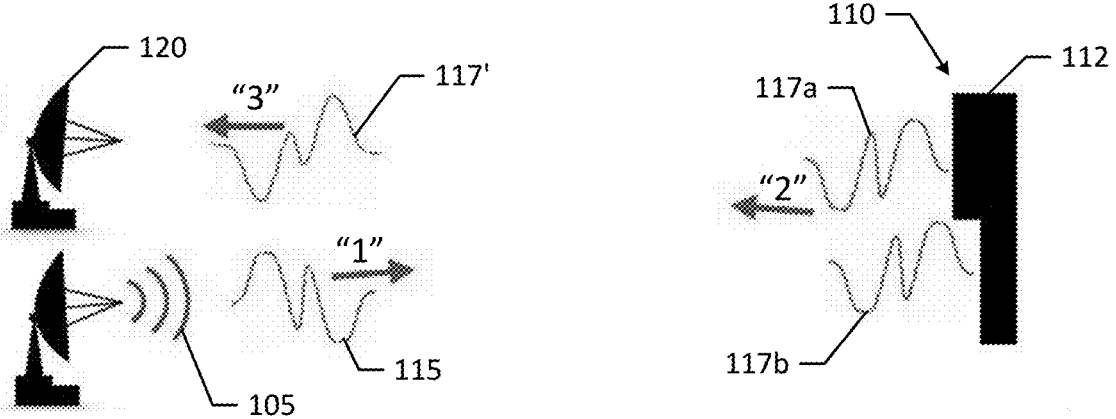
FIG. 1A illustrates a schematic view of an interferometric range resolution system, according to an example of the present disclosure.
Figure 1B:
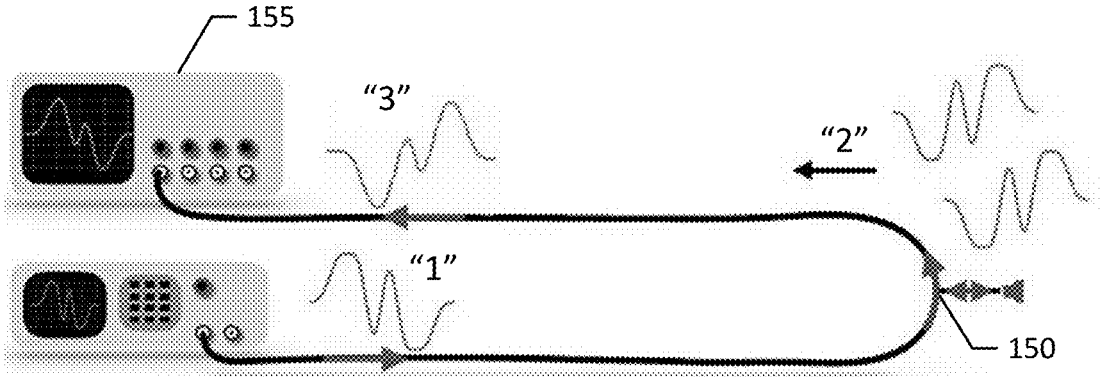
FIG. 1B illustrates a schematic for a low-noise guided-wave experimental setup, according to an example of the present disclosure.
Figure 1C:
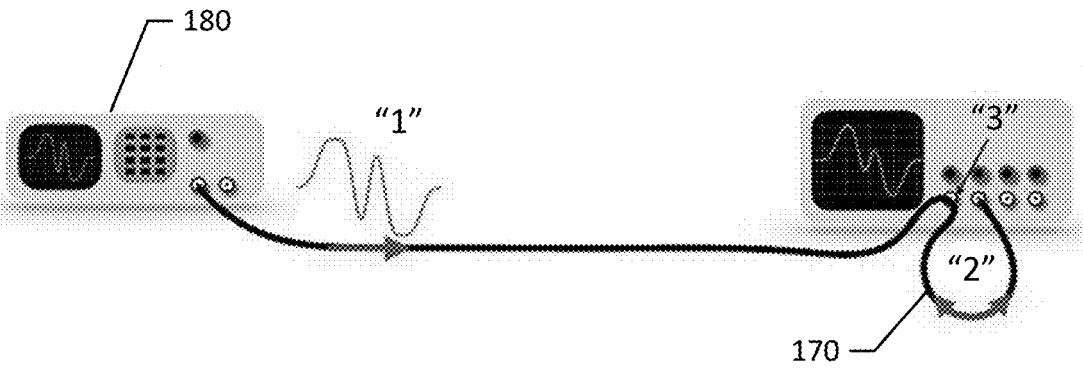
FIG. 1C illustrates a schematic for a low-noise guided-wave ranging experimental setup, according to an example of the present disclosure.

Here, a new "amplitude resolved" paradigm is introduced using self-referenced interference-class functions as shown in FIGS. 1A, 1B and 1C. An interference-class pulse 105 (resulting in waveform 115) is sent to a remote object 110. Multiple scattering depths along the same line-of-sight result in the interference of temporally shifted versions of the waveform (e.g., waveform 117a and waveform 117b). The resultant waveform 117' is measured by the receiver 120. By using parameter estimation, the range, distance between objects, relative scattering amplitudes, etc. may be determined.

The system illustrated in FIG. 1A relies on parameter estimation from the interference between coherent pulses. In the techniques disclosed herein, a fundamentally different parameter estimation has also been used to overcome the spatial Rayleigh resolution limit of incoherent sources using mode sorting allowing for fundamental definitions of spatial resolution. In an example, two incoherent optical pulses and mode decomposition may be used to achieve super temporal resolution.

The following factors and/or behaviors may be employed for estimating the distance between two scattering depths from a target which would otherwise be temporally subresolved. A first factor or behavior may include a region of the function that is sensitive to interference and thus may require extended and steep temporal gradients. A second factor or behavior may include a zero-gradient region within the function, which is insensitive to the interference, which is used as an amplitude reference. In this manner, as long as all portions of the pulse experience the same attenuation (or amplification) and there is a flat spectral response in a medium or upon reflection, the range resolution properties of the pulse are preserved.

Figure 2A:
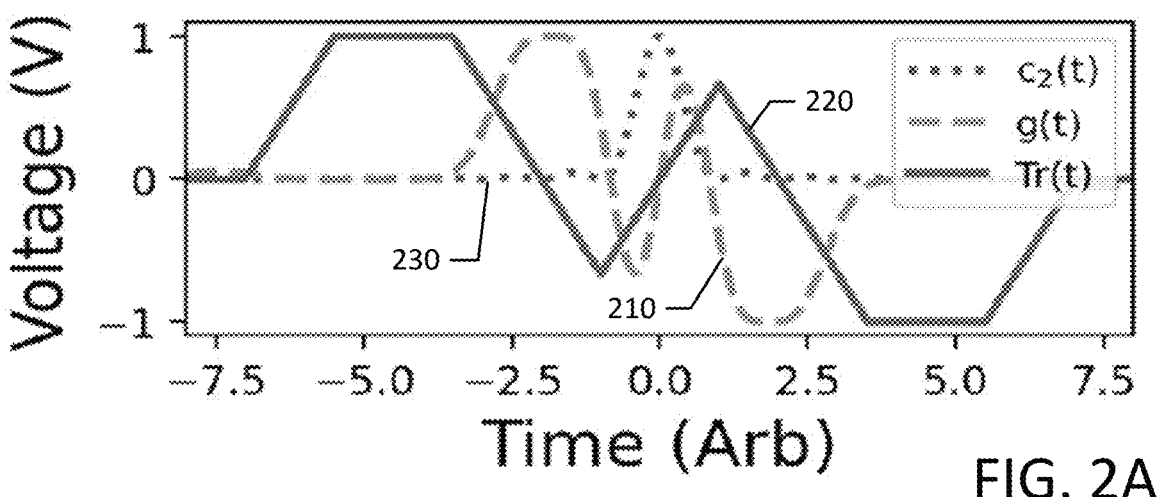
FIG. 2A illustrates a graphical representation of an inference-class bandlimited pulse g(t), an inference-class "triangle function" Tr(t), and a sinc$^2$ pulse $c_2(t)$, according to an example of the present disclosure.

FIG. 2A illustrates three types of pulse functions. The dashed line shows a specially designed interference-class, bandlimited pulse g(t) 210. The second interference class function is shown in solid line, which may be referred to as a "triangle" function Tr(t) 220. The dotted line shows a standard $\text{sinc}^2$ pulse $c_2(t)$ 230, which is not an interference-class function, but is used as a means of comparison of a Rayleigh criterion for temporal pulse resolution. The bandlimit for the $\text{sinc}^2$ and the functions 210 and/or 220 in illustrated in FIG. 2A is the same.

Figure 2B:
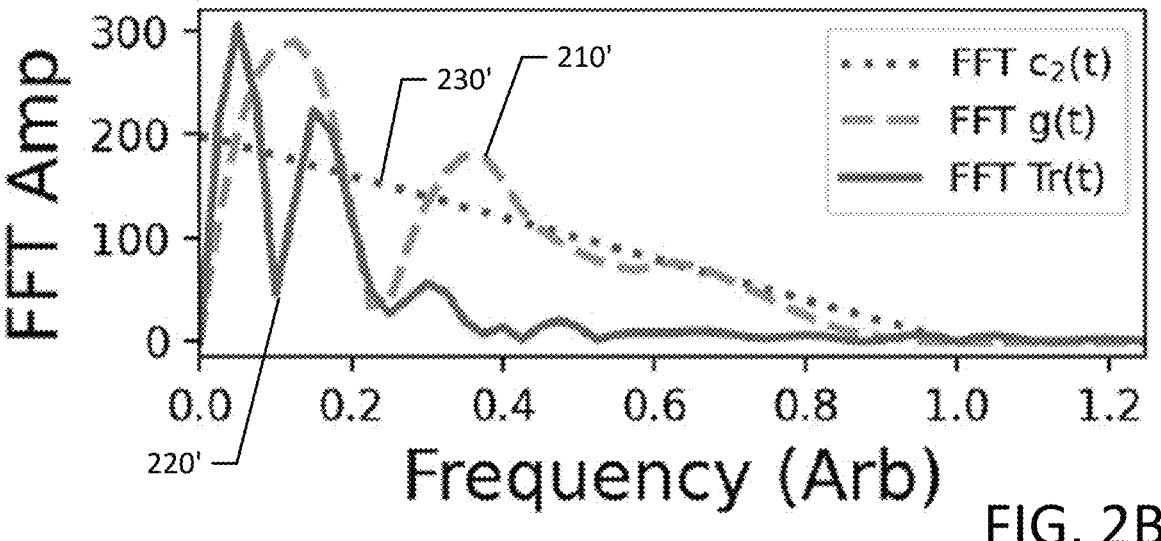
FIG. 2B illustrates a graphical representation the Fourier transforms of the functions illustrated in FIG. 2A, according to an example of the present disclosure.
Figure 2C:
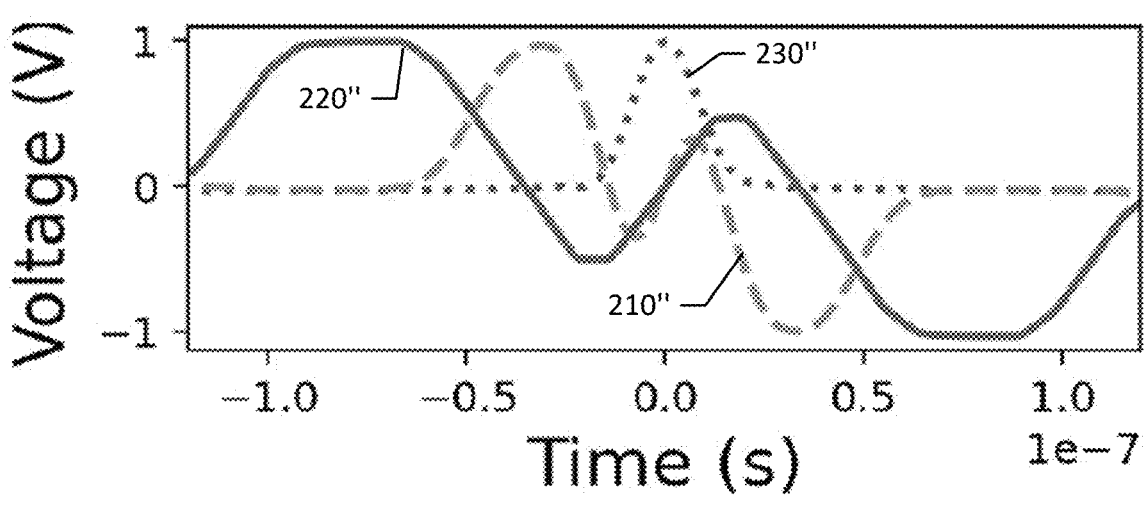
FIG. 2C illustrates a graphical representation of interfered waveforms from coherent inference of two equal-amplitude pulses, according to an example of the present disclosure.

The corresponding fast Fourier transforms of the three types of pulse functions of FIG. 2A are shown in FIG. 2B. The dashed line shows a fast Fourier transform ("FFT") of g(t) 210, which is indicated as "FFT g(t)" 210'. The solid line shows a FFT of the triangle function Tr(t) 220, which is indicated as "FFT Tr(t)" 220'. Additionally, the dotted line shows a FFT of the $\text{sinc}^2$ pulse $c_2(t)$ 230, which is indicated in FIG. 2B as "FFT $c_2$(t)" 230'. The interfered waveforms from the coherent inference of two equal-amplitude pulses for the above functions is illustrated in FIG. 2C and are indicated by corresponding dashed, solid, and dotted lines as 210", 220" and 230" respectively.

For the first type of self-referenced pulses, bandlimited function theory (e.g., used in super-oscillations) may be used to generate the specially designed functions disclose herein. It should be appreciated that similar behavior could be achieved with different types of bandlimited functions, other than those provided herein. Tailored and bandlimited functions, such as g(t) shown in Eq. 2, may be generated by exploiting the product of a band-limited "canvas" c(t) function of Eq. 3 and arbitrary (e.g., Taylor) polynomials $f_n(t)$ shown in Eq. 4.

$$g(t): = f_n(t)c(t) \qquad \text{(Equation 2)}$$

$$c_m(t) = \text{sinc}\left(\frac{\Omega t}{m}\right)^m \qquad \text{(Equation 3)}$$

$$f_n(t) = \sum_{k=0}^{n-1} a_k t^k \qquad \text{(Equation 4)}$$

For m>n the function g(t) shown in Eq. 2 is a square-integrable function with bandlimits set by $\Omega$.

For the second type of self-referenced functions, an idealized line-segment function, which may be referred to as a "triangle pulse" or "triangle" function Tr(t) is introduced. The "triangle pulse" function is shown as a solid line in FIG. 2A. The triangle pulse is not bandlimited, and approximations to the bandwidth may be considered based on the Fourier transform. In some scenarios, the "triangle pulse" function may be better for measuring the minimum distance between two objects (range resolved objects) owing to the linearity of a signal "S" (see Eq. 8 below) over the full interference range.

The third type of function is not an interference-class function but is used to define a temporally resolved function. Similar to the Rayleigh criterion, when the peak of one pulse is separated by a distance greater than a first minimum of a second pulse, the pulses may be considered to be resolved. A classic example is the sinc² function illustrated below in Eq. 5 and shown by a dotted line FIG. 2A.

$$c_2(t) = \mathrm{sinc}\left(\frac{\Omega t}{2}\right)^2 \qquad \text{(Equation 5)}$$

For a bandlimited pulse, the minimally Rayleigh-resolved temporal shift $t_R$ (the time analog of resolvability in space) is given by Eq. 6. How deeply the targets may be super-resolved is quantified by the ratio expressed in Eq. 7. where $t_d$ is the temporal delay between the two returning pulses. Since $r_s$ is both a function of the delay $t_d$ and the bandwidth $t_R=2\pi/\Omega$, it may be more precise to change the bandlimit to test the fundamental properties of the relative shift in the system rather than changing the relative pulse delay.

$$t_R = 2\pi/\Omega \qquad \text{(Equation 6)}$$

$$r_s = t_d/t_R \qquad \text{(Equation 7)}$$

A signal S, defined below in Eq. 8, is akin to balanced interferometric detection used to measure transverse deflections, namely, $$S = \frac{A_{cmax} - A_{cmin}}{A_{lmax} - A_{lmin}} \qquad \text{(Equation 8)}$$

where $A_{cmax}$, $A_{cmin}$ are the maximum and minimum amplitude of the function in the steep center region, respectively and $A_{lmax}$, $A_{lmin}$ are the maximum and minimum of the flat temporal lobes.

Referring back to FIGS. 1A, 1B and 1C, as illustrated in FIG. 1A, waveforms 115 are sent to a remote object 110, such as a two-depth target 112. Upon reflection, the two reflected waveforms 117 (e.g., 117a and 117b) interfere and are sent to the receiver 120. The two reflected waveforms 117a and 117b may interfere and form a resultant waveform 117'. The resultant waveform 117' may be measured and processed to estimate the distance between the two depths of the remote object 110 (e.g., two-depth target 112).

FIGS. 1B and 1C illustrate a low-noise guided-wave experiment setup. For example, FIG. 1B shows a guided-wave equivalent to the free-space radar illustrated in FIG. 1A. However, there may be unequal amplitudes from the scattered waves (e.g., waves 117a and 117b) measured at the receiver 155 based on the splitting ratios of the tee junction 150. To create equal-amplitude interference, the experimental setup shown in FIG. 1C was implemented, which is the radio wave equivalent of a Michelson interferometer. Michelson interferometry is a method for the direct detection of gravitational waves and involves detecting tiny strains in space itself, affecting two long arms of the interferometer unequally, due to a strong passing gravitational wave. In FIG. 1C, the delay cable 170 is connected to both channels 1 and 2. Channel 1 measures the interfered waveform and channel 2 measures the input (non-interfered) waveform. Both input channels on the scope are set at 1MfΩ to achieve the desired reflections and measurement. The experimental setups illustrated in FIGS. 1B and 1C and the results illustrated in FIGS. 2A-2C may utilize high precision frequency tunability to achieve ultra-small relative pulse shifts $r_s$.

The functions may be generated numerically consisting of 4000 points and a duration $40t_R$ units. During experimentation, the signals may be uploaded to an arbitrary waveform generator ("AWG"). Furthermore, in the illustrated examples, the bandlimit of the system may be set by the repetition rate of the arbitrary waveform generator. For example, a repetition rate of 1 MHz results in a 40 MHz bandlimit for the bandlimited pulses.

To perform the ranging experiments as shown in FIG. 1C, an arbitrary waveform generator 180 sends the signal down the cable 170. The g(t) pulse is sent to channel 1 of the oscilloscope and is teed to another cable which then adds a one-way temporal measured delay of $t_c$=4.4 ns (the measured delay is 3.8 ns when not connected to channel 2 and the measured cable length is $l_c$=72 cm) implying that the pulse delay is $t_d$=2tc=8.8 ns. The reflected signal from channel 2 interferes in channel 1 with the original displaced signal the g(t) function. When using the bandlimited function g(t), for example, channel 1 then measures g(t)+g(t+2$t_c$) and similarly for the other functions.

FIG. 2C shows the resultant interference waveform in channel 1 for the three different types of pulses used herein for $t_s$=0.5$t_R$. There are several important features of this graph that are described in more detail below. First, the $c_2(t)$ interference pattern 230" is not resolved, as expected, since $t_s$=0.5$t_R$. Second, there are interference regions in the center of the g(t) interference pattern 210" (e.g., peaks have changed value) and the interference pattern 220" for the triangle functions Tr(t) have changed dramatically (e.g., see interference plateaus). Third, the heights of the side lobes are still roughly constant for both interference-class functions.

Figure 3:
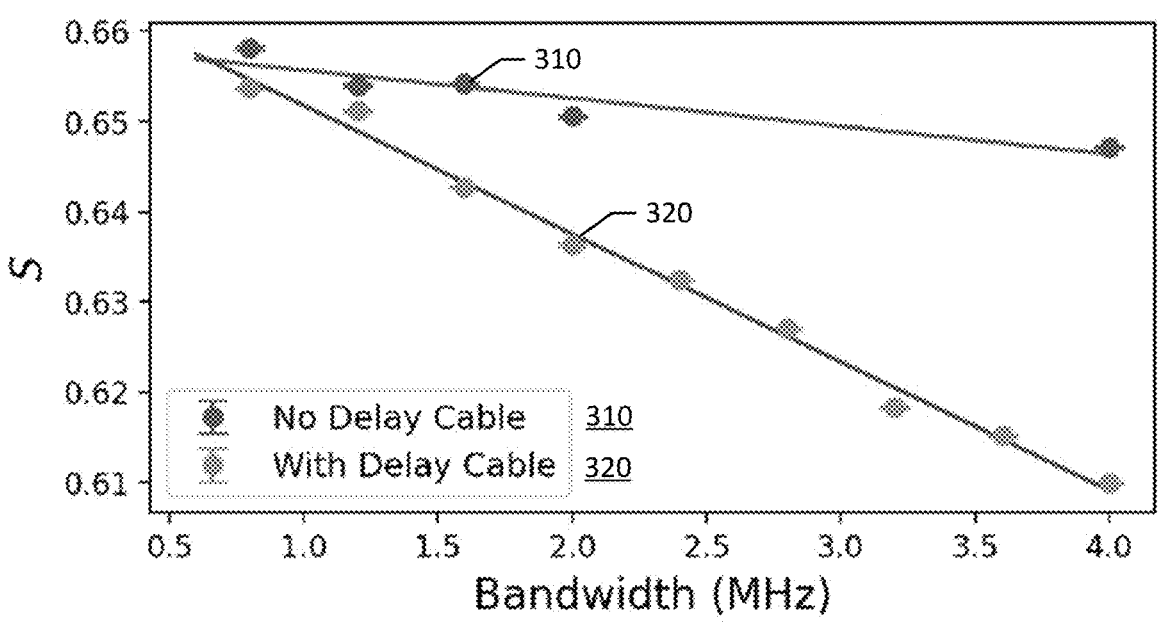
FIG. 3 illustrates a graphical representation of a signal S plotted against bandwidth of the triangle function with a delay cable (e.g., interference) and without a delay cable (e.g., no interference), according to an example of the present disclosure.
Figure 4:
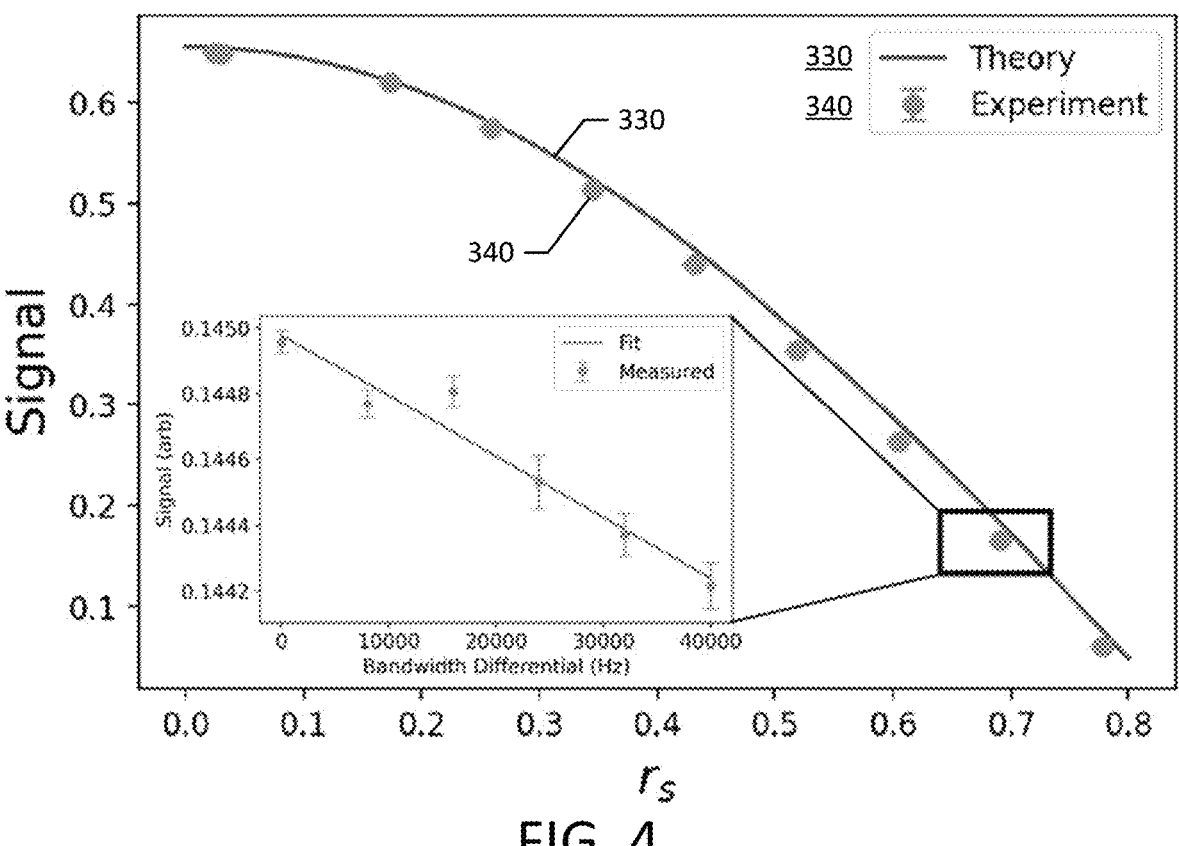
FIG. 4 illustrates a graphical representation of Signal S vs time shift, according to an example of the present disclosure.

For the range resolution system described herein two important figures for consideration are (i) the minimum distance to amplitude-resolve two objects, which is illustrated in FIG. 3 and (ii) the distance resolution between objects when the objects are amplitude resolved, but still temporally sub-resolved (i.e. $r_s$<1), which is illustrated in FIG. 4.

The triangle function Tr(t) 220 described above is designed to amplitude-resolve two objects with depths that are closely spaced along the same line-of-sight. Typically, in radar, the spectral bandwidth is given by the width of the spectrum at the 3 dB down point. However, owing to the irregular spectrum of the triangle pulse, a conservative estimate is used based on where most of the power is found. Using the bandwidth from the Fourier transform as shown in FIG. 2B, the figure illustrates that most of the power lies below 20 percent of the bandlimit for the bandlimited functions using the same pulse repetition rate. As noted above, the bandlimited frequency was forty times (e.g., 40X) the repetition rate. From this observation, a conservative bandwidth of the triangle function may be defined to be eight times (e.g., 8X) the pulse repetition rate.

The resolving power of the triangle function can be determined from FIG. 3. In the example illustrated in FIG. 3, a 72 cm delay cable was used. For example, the 72 cm delay cable may be disconnected from channel 2 and only connected to channel 1 yielding a 7.6 ns round-trip delay time. Additionally, the bandwidth of the triangle pulse may be changed until the S curve with and without a cable was indistinguishable. In the illustrated example, at approximately 1 MHz bandwidth, it is possible to distinguish the signal with and without the delay cable. For example, the S curves may start to depart slightly before 1 MHz and continue to diverge from each other as the Bandwidth increases. In the illustrated example, the point where the S curves become distinguishable corresponds to $r_s \approx 0.008$ or better than 100 times (e.g., 100×) the inverse bandwidth.

To further demonstrate the power of the techniques described herein, the 72 cm cable may be removed and instead only the extra path length of a Bayonet Neill-Concelman ("BNC") T-junction may be used, which has an approximate 1.3 cm path length. In one example, a 2.5GSa/s triangle function may be used with 10 samples per time unit $t_R$ (401 total points as opposed to 4000 described above) and the interference signal may be measured on an 800 MHz oscilloscope. The estimated bandwidth of the signal, based on the Fourier transform, was approximately 100 MHz. The estimated bandwidth of the signal may also have a small amount of frequency content up to 500 MHz. With and without the T-junction, in the illustrated example, the value of S may be determined to be 0.5573±0.0002 and 0.5511±0.0004, respectively or a separation of 15 standard deviations. The results described above implies sub-mm resolution. To increase the cable length, in another example, a male-to-male BNC connector may be included to add another couple centimeters to the path length, which may result in the value dropping to 0.5285 \pm 0.0001.

Moving now to FIG. 4, the ability to determine the distance between two objects for temporally sub-resolved pulses is an important aspect of range resolution. FIG. 4 shows the signal S vs $r_s$ (the ratio of the round-trip cable delay to the Rayleigh criterion) using the bandlimited function g(t). Specifically, the signal S from Eq. (8) above may be computed and measured as a function of the relative shift of two g(t) functions. As demonstrated in FIG. 4, the theory and experimental results are in close correlation.

The slope of S from FIG. 4 indicates the sensitivity of the system to changes in the relative temporal shift of the two functions. The S function for the bandlimited pulse may be roughly quadratic in the region of zero shift and becomes linear after about $r_s$=0.5 or half the Rayleigh resolved time. Additionally, FIG. 4 may be used to show how well the system described herein can determine the relative time between two relative shifts $r_{s1}$ and $r_{s2}$. For a fixed cable length, where $\Delta r_s = r_{s2} - r_{s1}$ and $\Delta\Omega/2\pi$ is the smallest resolvable change in the bandwidth of the pulse.

$$\Delta r_s = 2t_c \frac{\Delta\Omega}{2\pi} \qquad \text{(Equation 9)}$$

In the inset of FIG. 4, the figure shows the change in the signal of a small incremental frequency shift. In the illustrated example, using the 72 cm cable with $t_c$=4.4 ns delay and a 2 MHz repetition rate ($\Omega/2\pi$=80 MHz bandlimit) resulted in approximately $t_s$=0.69 shift. The bandwidth of the pulses was changed from 79.960 MHz to 80.000 MHz in increments of 8.0 kHz. In the illustrated example, each trace was averaged 512 times, and each setting was measured 10 times with 15 to 30 seconds between each measurement. Assuming a signal to noise ratio of 1, 80 MHz bandwidth changes may be resolved down to about 3.2 kHz, which implies $\Delta r_s = 2.8 \times 10^{-5}$. The inferred depth resolution of the system described herein is then $\Delta x = v_c t_R \Delta r_s / 2 \approx 20$ μm. Thus, for a target with two equal-amplitude, temporally sub-resolved reflected pulses, the relative distance between them may be measured down to 35,000 times below the Rayleigh limit and several orders of magnitude below the timing resolution of the oscilloscope.

While the majority of the description herein is dedicated to equal-amplitude reflections like those obtained using the setup in FIG. 1C, it should be appreciated that in realistic applications, target reflection amplitudes may be unequal, like those generated in FIG. 1B. In an example, a two-parameter signal may involve both the amplitude and disparate amplitude.

It should be appreciated that even though the experiments described herein use low frequency radio wavelengths, the results and discussion are equally valid in all parts of the electromagnetic spectrum. Additionally, the systems, methods and techniques described herein may be generalized to account for disparate reflection amplitudes and multiple layers by creating more exotic functions and signal analysis. Furthermore, converting time resolution to space resolution by transversely scanning the receiver in FIG. 1A and solving the inverse problem for high resolution imaging may be achieved via the techniques described herein.

The systems, methods and techniques described herein are advantageously capable of obtaining range resolution far better than the Rayleigh criterion or the inverse bandwidth. As further described herein, coherent aspects of radio wave transmission and detection may be employed to measure sensitive interference patterns. While the description above demonstrates that long wavelength waves may be applied to resolve features of a target that are many times smaller than the shortest wave component of a pulse. For example, the experimentation described above shows a bandlimited pulse can be used to resolve two depths finer than ten times (e.g., 10X) historic radar resolution limits. However, as described in more detail below, the pulse shape may be optimized, and data processing of the return signal may also be improved.

Pulse Shape Optimization

The systems, methods and techniques described herein are also directed to determining the best radar ranging pulse based on a constraint of a fixed band-edge for the Fourier transform. The optimal pulse described herein advantageously maximizes the Fisher information for the simplest case of two point reflectors of equal amplitude.

An example case of two equal amplitude point scatterers of electromagnetic radiation may be used to determine (i) the minimal discrimination distance of two targets and (ii) the precision on the range between them, focusing on subwavelength range resolution. It should be appreciated that range resolution is different from (and a different determination than) ranging accuracy, when resolving two or more targets, the reflected waves interfere giving rise to ambiguity in the return signal. A one-dimensional model is introduced below where the electric field spatial envelope, of the form $f(x)$, is sent out and a return wave of the form is detected.

$$f_i(x) = \frac{1}{2}\left(f\left(x - l/2\right) + f\left(x + l/2\right)\right) \qquad \text{(Equation 10)}$$

For simplicity, in the proposed model, the origin is set to halfway between the two scattering centers. In Eq. (10) l is the distance between the two scatterers (e.g., the distance the techniques disclosed herein may determine and/or estimate). In a remote sensing context, the amplitude of the returning pulse is typically attenuated from the out-going intensity by many orders of magnitude. Therefore, the technique may impose a condition (e.g., an assumption) that the absolute amplitude of the pulse is unrelated to the target properties, and thus is not used in the range resolution estimation task. The normalized version of Eq. (10) may be considered and either (a) the amplitude of the returning field relative to the detector noise or (b) the number of detected photons as the metrological resource may be taken. Other model conditions and/or assumptions may include that the function $f$ is analytic and normalized, (note that unnormalized wave forms are addressed in more detail below where the estimation also takes into consideration time-of-flight and total loss, as well as the range resolution parameter). In an example, the function in Eq. (10) is band-limited, having an upper frequency cut-off $f_0$. The range resolution parameter (e.g., $1 < 1/(2\pi f_0)$) may break the long-standing trade-off between target resolution and wave carrier frequency. Additionally, the velocity of the pulse inside the medium may be set equal to unity.

In an example, the inverse Fisher information bounds the variance of any unbiased estimator $\hat{1}$ of the parameter 1, for large data sets is shown below, where M is the number of repetitions of the measurement, the Cramer-Rao bound (as of note, Fisher information has been applied to bound estimation precision in coherent and incoherent optics).

$$\mathrm{Var}[\hat{1}] \geq \frac{1}{MI(l)} \qquad \text{(Equation 11)}$$

The Fisher information for noisy field detection is given by Eq. (12), where $\mathcal{N}_l$ is the $\mathcal{N}_l$ parameter-dependent normalization, and $\Sigma^2$ is the detector noise power, relative to the signal size. The result can be further simplified for range resolution as Eq. (13).

$$I_f \approx \frac{1}{\Sigma^2} \int dx \left( \frac{\partial(\mathcal{N}_l f_i(x))}{\partial l} \right)^2 \qquad \text{(Equation 12)}$$

$$\Sigma^2 I_f = -(\partial_l \ln \mathcal{N}_l)^2 + \frac{\mathcal{N}_l^2}{16} \int dx (f'(x+l/2) - f'(x-l/2))^2 \qquad \text{(Equation 13)}$$

In Eq. (13) above, the small 1 (deep subwavelength) behavior is given by Eq. (14). By using well-defined first and second derivatives of the function $f(x)$, as well as square integrability, the term in parenthesis from Eq. (14) may be written as Eq. (15), where the variance of the operator is defined as $\hat{p}=-i\partial_x$, in the state $f$ as $\mathrm{Var}[\ldots]_f$. By doing so, in the position basis, the previous result for the classical Fisher information is recovered as expected. The variance of $\hat{p}^2$ can be calculated most easily in momentum space (k) to find Eq. (16) where $\tilde{f}$ is the Fourier transform of $f$. In some examples, band limited functions have a spectral weight that is exactly zero beyond the band edge $[-k_0, k_0]$.

$$\Sigma^2 I_f \approx \frac{l^2}{16} \left( \int dx f''(x)^2 - \left( \int dx f'(x)^2 \right)^2 \right) \qquad \text{(Equation 14)}$$

$$\mathrm{Var}[\hat{p}^2]_f = \int dx f''(x)^2 - \left( \int dx f'(x)^2 \right)^2 \qquad \text{(Equation 15)}$$

$$\mathrm{Var}[\hat{p}^2]_f = \int_{-\infty}^{\infty} dk |\tilde{f}(k)|^2 k^4 - \left( \int_{-\infty}^{\infty} dk |\tilde{f}(k)|^2 k^2 \right)^2 \qquad \text{(Equation 16)}$$

Best Wave

From the Cramer-Rao bound, an optimal (e.g., best) precision on the range resolution may be obtained when the Fisher information is maximized. Focusing on the deep subwavelength resolution case, waveforms that maximize the variance of the square of the momentum are sought after, when given a constraint that the pulse is band limited. For example, the spectral weight may be zero for $|k| > k_0$. Results in quantum metrology may be leveraged when dealing with normalized waveforms. For example, in order to maximize the variance of an operator $\hat{A}$, the state may be prepared such that it is an equal superposition between the maximum and minimum eigenvalue, where eigenstates $|a_j\rangle$ of the operator $\hat{A}$ such that $\hat{A}|a_j\rangle = a_j|a_j\rangle$ are introduced. In the illustrated example, the values $a_{max}$ or $a_{min}$ are the maximum or minimum eigenvalue.

$$|\psi\rangle = \frac{|a_{max}\rangle + |a_{min}\rangle}{\sqrt{2}} \qquad \text{(Equation 17)}$$

$$\langle \psi | \hat{A}^2 | \psi \rangle - \langle \psi | \hat{A} | \psi \rangle^2 = \frac{1}{4}(a_{max} - a_{min})^2 \qquad \text{(Equation 18)}$$

Applied to the examples provided herein, the case where $\hat{A} = \hat{p}^2$ is of interest. For band-limited functions the maximum eigenvalue is $$k_0^2,$$

which can be realized with momentum eigenstates $|\pm k_0\rangle$. By taking the symmetric combination, $|\lambda_{max}\rangle = |-k_0\rangle)/\sqrt{2}$, the minimum eigenvalue is 0, corresponding to the momentum eigenstate $|\lambda_{min}\rangle = |0\rangle = |0\rangle$, corresponding to a dc off-set.

An optimal state is given by $|\psi\rangle = (\frac{1}{2})(|k_0\rangle + |-k_0\rangle) + (1/\sqrt{2})|0\rangle$, which corresponds to a three-tooth frequency comb with weights $\frac{1}{2}$ at the band edges and weight $1/\sqrt{2}$ at zero frequency. In real space the wave is given by Eq. (19). The overall amplitude may be unimportant for the analysis since the wave is a non-normalizable wave. The variance of the momentum squared for the wave is given for Eq. (18) by Eq. (20).

$$\psi(x) = \cos(k_0 x) + 1/\sqrt{2} \qquad \text{(Equation 19)}$$

$$\mathrm{Var}[\hat{p}^2]_\psi = k_0^4/4. \qquad \text{(Equation 20)}$$

The example equations above sets the upper bound of the variance for band-limited waves. Unfortunately, the wave exists across all space, and also has a DC off-set, which may make the wave useless for radar ranging. The next section shows how performance may be approached using a finite-energy pulse.

In the example above, the reason for the DC offset is that the height of the two comb-teeth at the band edges changes when the separation $l$ is varied, but the overall signal return is assumed to be unrelated to the scattering problem. Similar to the methods and techniques discussed above, the DC offset provides a self-referencing feature to the pulse. In an example, the zero frequency comb tooth is insensitive to the separation $l$, so its height, compared to the band-edge heights, permits the unambiguous estimation of the separation of the reflectors.

Best Pulse

While, in the example above, the result is optimized for a pure sinusoidal wave, it may be required that normalizable functions are permitted that vanish sufficiently fast for large time (or space), corresponding to a finite energy solution. By rescaling the momentum scale in units of $k_0$, ($p=k_0u$), the scaled variance of $\hat{p}^2$ is given by Eq. (21). According to the result of Eq. (20), the quantity defined as $$\mathcal{R} = 4\mathrm{Var}(\hat{p}^2)/k_0^4,$$

is between [0, 1].

$$\frac{4\mathrm{Var}(\hat{p}^2)}{k_0^4} = 4\left[\int_{-1}^{1} du\,|\tilde{f}(u)|^2 u^4 - \left(\int_{-1}^{1} du\,|\tilde{f}(u)|^2 u^2\right)^2\right] \quad \text{(Equation 21)}$$

In an example, one method or technique for creating a bandlimited waveform is to take the optimal wave from Eq. (19) and multiply it by a sinc function, which shifts the band edge, but the wave frequency may be readjusted so the band edge is kept the same (see Eq. 22 below).

$$S(x) = \sqrt{\frac{k_0}{\pi}}\,\mathrm{sinc}\left(\frac{k_0 x}{d}\right)\left(\cos\left(k_0 x\left(1-\frac{1}{d}\right)\right) + \frac{1}{\sqrt{2}}\right) \quad \text{(Equation 22)}$$

Figure 5:
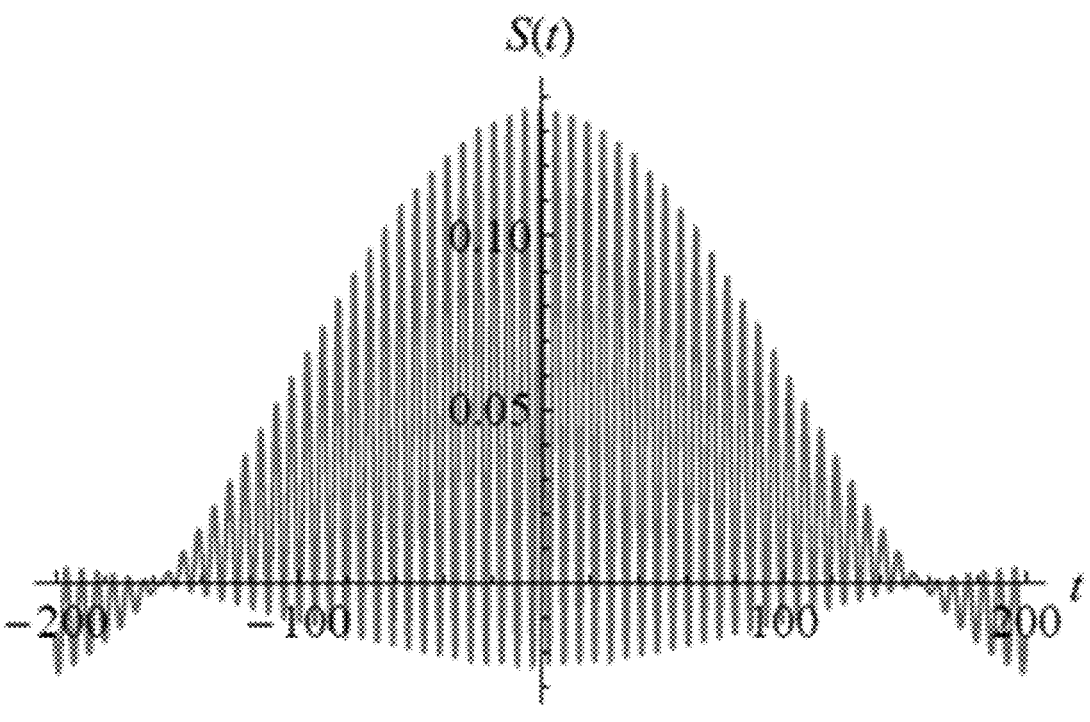
FIG. 5 illustrates a plot of S(t) versus t for the value d=50, corresponding to $\mathcal{R} \approx 0.9$, according to an example of the present disclosure.
Figure 6:
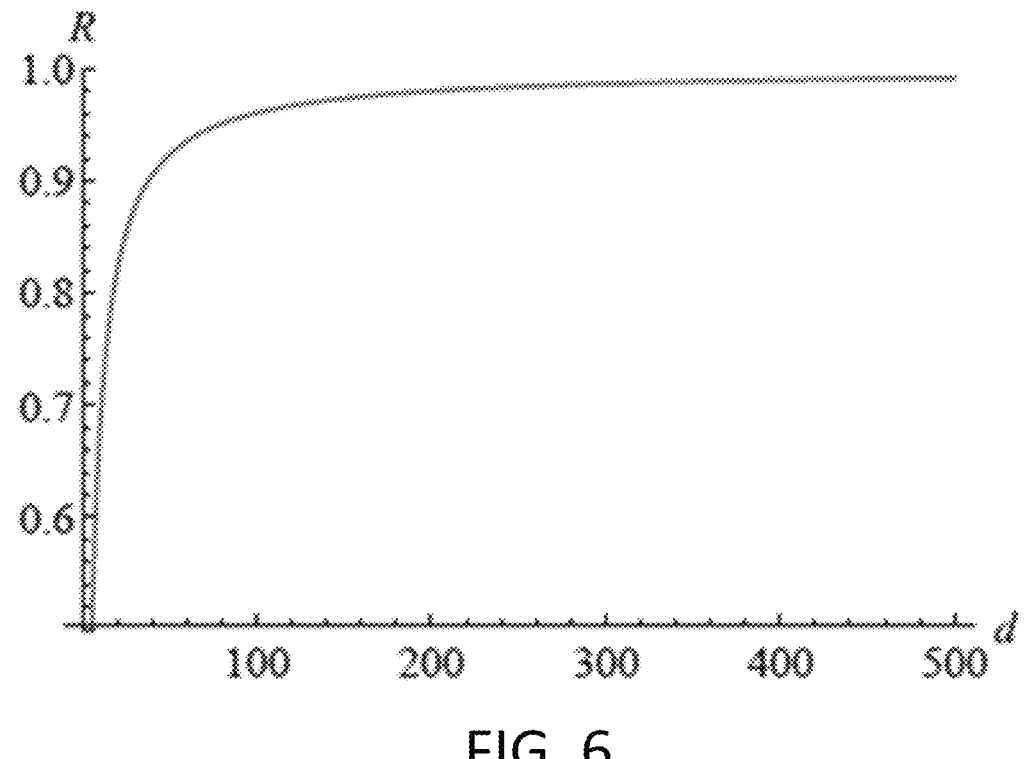
FIG. 6 illustrates a plot of $\mathcal{R}$ versus d, according to an example of the present disclosure.

In Eq. (22) above, the dimensionless parameter d controls how long the sinc function takes to decay in time, giving a finite-energy wave, which was chosen to normalize. An example is shown in FIG. 5 for the value d=50. Specifically, FIG. 5 illustrates a plot of S(t) versus t, which is represented in units of $1/k_0$ for the value d=50, corresponding to $\mathcal{R} \approx 0.92$. The sinc function has the effect of turning the delta-spikes in the Fourier domain into rectangles the parameter d increases, the resolving ability of the pulses increases toward $\mathcal{R}=1$, but at the price a progressively longer pulse, as shown in FIG. 6.

Another approach to finding these special waveforms capable of approaching the upper limit on the variance of the square-momentum is by using a technique based on orthogonal function theory. For example, the waveform may be written in the Fourier space as a superposition of Legendre polynomials, $P_n(u)$, as shown in Eq. (23) below.

$$\tilde{f}(u) = \sum_{n=0}^{\infty} c_n \sqrt{\frac{2n+1}{2}}\,P_n(u) \quad \text{(Equation 23)}$$

In Eq. (22), $c_n$ are an arbitrary set of complex coefficients. In an example, the polynomials are defined on [−1, 1] and define an orthonormal function basis of band-limited functions, shown below in Eq. (24) and the normalization of the pulse may be imposed (as shown in Eq. (25)) where the orthonormality of the scaled Legendre polynomials is used. In real space, the Fourier transform of the Legendre polynomials are spherical Bessel functions $j_n(t)$, which is illustrated below by Eq. (26).

$$\int_{-1}^{1} du \sqrt{\frac{2n+1}{2}}\,p_n(u)\sqrt{\frac{2m+1}{2}}\,P_m(u) = \delta_{n,m} \quad \text{(Equation 24)}$$

$$\int_{-1}^{1} du\,|\tilde{f}(u)|^2 = \sum_{n=0}^{\infty} |c_n|^2 = 1 \quad \text{(Equation 25)}$$

$$f(t) = \sqrt{\frac{2}{\pi}}\sum_{n=0}^{\infty} c_n \sqrt{\frac{2n+1}{2}}\,i^n j_n(t) \quad \text{(Equation 26)}$$

The second moment of u may be found through Eq. (27) with matrix elements defined by Eq. (28).

$$\langle u^2\rangle_f = \int_{-1}^{1} du\,|\tilde{f}(u)|^2 u^2 = \sum_{n,m=0}^{\infty} c_n c_m^* (u^2)_{n,m}. \quad \text{(Equation 27)}$$

$$(u^2)_{n,m} = \sqrt{\frac{2n+1}{2}}\sqrt{\frac{2m+1}{2}}\int_{-1}^{1} du\,P_n(u)P_m(u)u^2 \quad \text{(Equation 28)}$$

Based on the above representations, the second moment may be written as a quadratic form using a vector of coefficients $\vec{c}$ and a matrix $u^2$ as shown in Eq. (29) below. Furthermore, the matrix $u^2$ may be diagonalized by introducing eigenvalues $\lambda_n$ and eigenvectors $\vec{v}_n$, shown in Eq. (30). An optimized set of coefficients may be chosen, as discussed above, in order to maximize the variance of $u^2$ in order to maximize the variance of $(\hat{p})^2$. The optimized set of coefficients is represented in Eq. (31) and the max and min refer to the eigenvectors associated with the smallest and largest eigenvalues, which then provides Eq. (32).

$$\langle u^2\rangle_f = \vec{c}^{\dagger}\cdot u^2 \cdot \vec{c} \quad \text{(Equation 29)}$$

$$u^2 \cdot \vec{v}_n = \lambda_n \vec{v}_n \quad \text{(Equation 30)}$$

$$\vec{c}_{opt} = \frac{1}{\sqrt{2}}(\vec{v}_{max} + \vec{v}_{min}) \quad \text{(Equation 31)}$$

$$\mathrm{Var}[u^2]_f \frac{1}{4}(\lambda_{max} - \lambda_{min})^2 \quad \text{(Equation 32)}$$

Figures 7, 8:
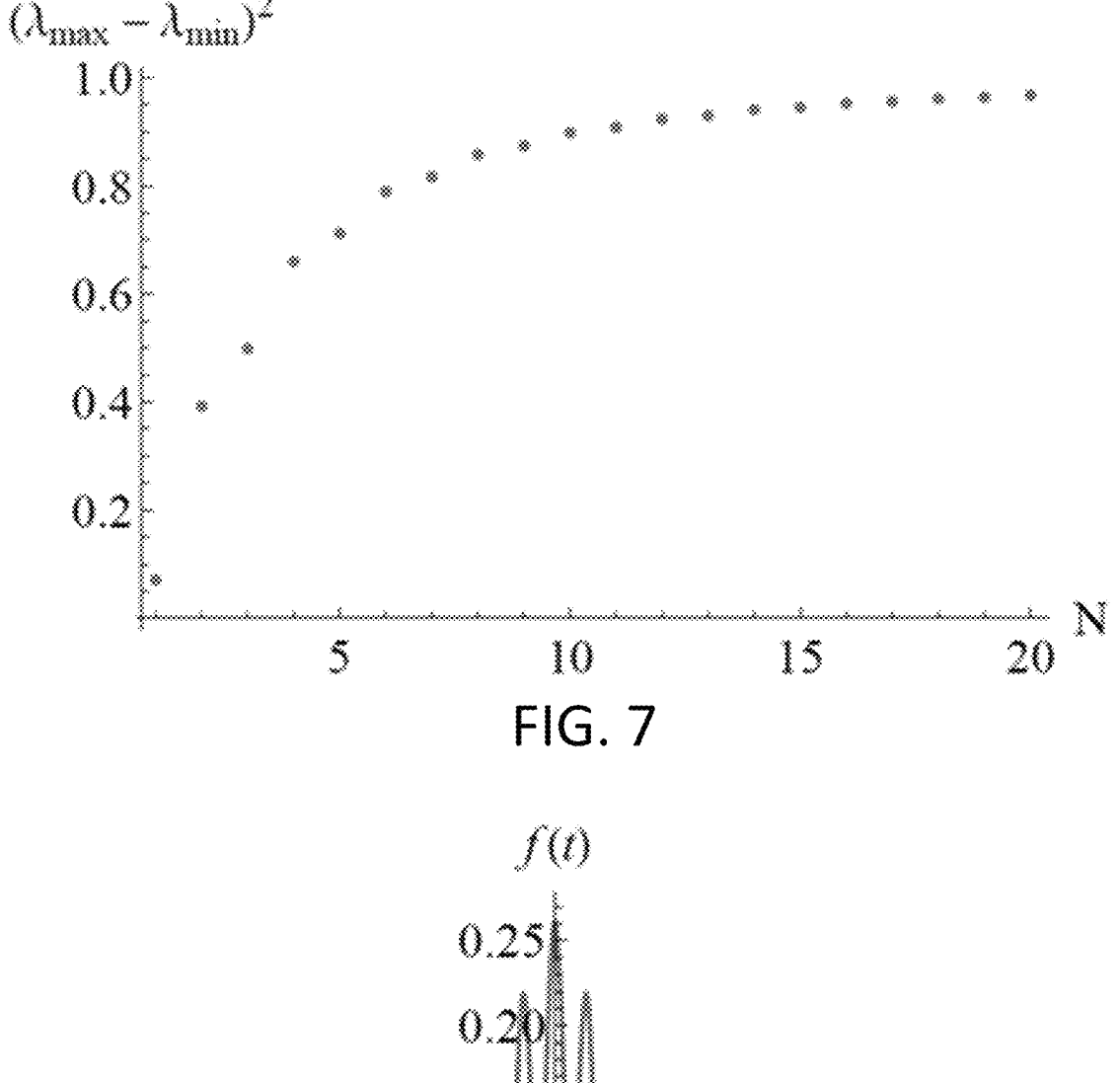
FIG. 7 illustrates a plot of the square difference of maximum and minimum eigenvalues of matrix u$^2$ is plotted against matrix dimension N, according to an example of the present disclosure.
FIG. 8 illustrates a plot of an optimal pulse for the dimension N=12 plotted versus time t (or position), in units of the inverse bandedge, according to an example of the present disclosure.

In practice, the matrix $u^2$ may be truncated at a finite dimension N. By doing so, the variance of the second moment of the momentum can be shown, which increases as N is in-creased. The square difference of the maximum and minimum eigenvalue is plotted versus matrix dimension N in FIG. 7. As illustrated in FIG. 7, the square difference of the maximum and minimum eigenvalue rapidly approaches an upper bound of 1. For the case where N=12, the optimal waveform is plotted in FIG. 8. Specifically, FIG. 8 illustrates a plot of the optimal pulse for the dimension N=12 is plotted versus time t (or position), in units of the inverse bandedge. In the example illustrated in FIG. 8, the function corresponds to $\mathcal{R} \approx 0.92$. In both this case, and the example of FIG. 5, the parameter $\mathcal{R} \approx 0.92$, which illustrates that this construction is more compact in time (or space).

Shifted Bandwidth

For technical reasons, analysis may be restricted to working between a finite band [$k_1,k_2$], that is asymmetric around 0 frequency (e.g., $k_1,k_2>0$ may be used for simplicity, otherwise the dc offset is kept). The preceding derivation described herein may be adapted to this case. For the best wave, there may be a superposition of the upper and lower band edges (shown in Eq. (33)), so the maximum variance is given by Eq. (34) where $\Delta k=k_2-k_1$ is the bandwidth, and $\bar{k}=(k_1+k_2)/2$ is the central frequency.

$$|\psi\rangle = \frac{1}{\sqrt{2}}(|k_1\rangle + |k_2\rangle) \quad \text{(Equation 33)}$$

$$\mathrm{Var}[\hat{p}^2]_\psi = \Delta k^2 \bar{k}^2 \quad \text{(Equation 34)}$$

To adapt the best pulse results to an asymmetric bandwidth, the bandlimited function may be mapped to the frequency interval [−1,1] by a change of variable. To map a function $f(\tau)$ of dimensionless time $\tau$ back to a function $g(t)$ of real time and an arbitrary bandwidth $[k_1,k_2]$, the relationship in Eq. (35) may be used.

$$g(t) = f\left(\frac{t\Delta k}{2}\right)\exp\left(i\bar{k}t\right) \qquad \text{(Equation 35)}$$

Figure 9:
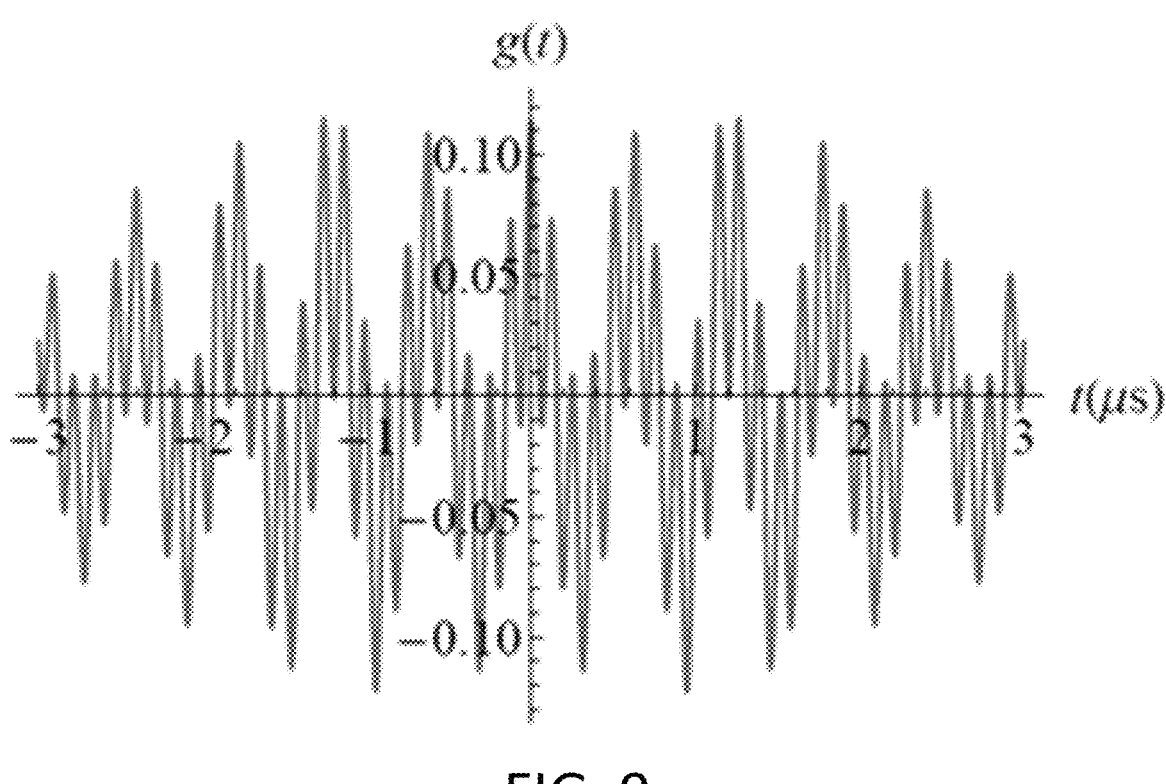
FIG. 9 illustrates a plot of an optimal pulse plotted in time (in μs) for dimension N=12, and a shifted band-limit of $k_1$=10 MHz/2π and $k_2$=50 MHz/2π, according to an example of the present disclosure.

However, in order to find a suitable pulse approximation to this optimal wave, the methods and techniques previously described may be applied to instead optimize the variance of P, which will produce an equally weighted state at the band edges before it is shifted as shown above. An example of a shifted solution is shown in FIG. 9, for a physical band limit of $[10\text{-}50]/2\pi$ MHz. Specifically, FIG. 9 illustrates an example of an optimal pulse plotted in time (in μs) for dimension N=12, and a shifted band-limit of $k_1$=10 MHz/$2\pi$ and $k_2$=50 MHz/$2\pi$. Before shifting, the state corresponds to a variance $\text{Var}[\hat{p}]_g = \langle u^1 \rangle \approx 0.97$, approaching the upper bound of 1. The resulting waveform provides a normalized, band-limited, pulsed version of the wave cos(10t)+cos(50t), where t is here measured in μs.

Unnormalized Waveforms

Unnormalized waveforms may be analyzed and/or optimized, and overall amplitude of the returning signal may be estimated. An example model may be considered where a waveform $f(x)$ is sent out and a returning waveform is measured together with the detector noise $\xi(x)$ with noise power $\sigma^2$ as shown in Eq. (36) below. In Eq. (36), A is the overall reduction of amplitude (typically orders of magnitude lower than the sent amplitude) that may be assumed to be independent of the other parameters for the purposes of the analysis. The range resolution is 1, and the temporal (converted to spatial) offset of the pulse $x_0$ is also included and may be estimated.

$$s(x_k) = A[f(x - x_0 + l/2) + f(x - x_0 + l/2)]/2 + \xi(x). \qquad \text{(Equation 36)}$$

Multi-parameter estimation may be applied to the model, given data (x). The Fisher information for a multi-dimensional Gaussian distribution is shown in Eq. (37) where the mean of the distribution at position x is provided by Eq. (38) and where $\vec{\theta} = (A, x_0, l)^T$ is the parameter vector to be estimated.

$$I_{ij} = \frac{1}{\sigma^2}\sum_k \frac{\partial \mu_{\vec{\theta}}(x_k)}{\partial \theta_i}\frac{\partial \mu_{\vec{\theta}}(x_k)}{\partial \theta_j} \qquad \text{(Equation 37)}$$

$$\mu_{\vec{\theta}}(x) = A[f(x - x_0 + l/2) + f(x - x_0 - l/2)]/2 \qquad \text{(Equation 38)}$$

In an example, a deep subwavelength case may be of interest and thus Eq. (38) may be expanded to a leading order in I as shown in Eq. (39).

$$\mu_{\vec{\theta}}(x) \approx A\left[f(x - x_0) + \frac{l^2}{8}f''(x - x_0)\right]. \qquad \text{(Equation 39)}$$

EXAMPLE

The following example illustrates many of the challenges described above. Consider Eq. (40) below with $$\mu \approx A\left(1 - k_0^2 l^2/8\right)\sin(k_0(x - x_0)).$$

The mean has an effective loss factor $$A' = A\left(1 - k_0^2 l^2/8\right)$$

that may be indistinguishable (e.g., impossible to distinguish) from the range parameter I if both are fixed for this simplest wave. Additionally, if the wavenumber $k_0$ is changed, that the relative amplitude will change such that I can be estimated, which is a strategy that can be exploited with a frequency comb technique, or even the optimal 3-tooth comb discussed above.

$$f(x - x_0) = \sin(k_0(x - x_0)) \qquad \text{(Equation 40)}$$

The sum over space may be written in the Fisher information as an integral, $\Delta X\Sigma_k = \int dx$, where $\Delta x$ is the discretization of space (converted from time), and define $\Sigma'^2 = \Delta x\sigma^2$ to find the Fisher information (to leading order) to be Eq. (41).

The normalization of the sent waveform may be set to be 1 for simplicity, $\int dx f^2 = 1$. Note that the zero off-diagonal elements involve either $\int dx f(x-x_0)f'(x-x_0)$ or $\int dx f'(x-x_0)f''(x-x_0)$, both of which are integrals of total differentials, which may vanish for finite time pulses.

The arrival time $x_0$ may be asymptotically uncorrelated with the amplitude A or range resolution l because of the block form of the Fisher information matrix, so it can be independently estimated. However, as noted above, the estimation of l independently from A is challenging because there are off-diagonal elements. Focusing on just the estimation of those two parameters reduces the Fisher information to a 2 by 2 matrix, which may be inverted.

Inverting the matrix gives the matrix form of the Cramér-Rao bound, $\text{Var}[\theta_i\theta_j] \geq (I^{-1})_{ij}$, i,j=A,l, where the inverse Fisher information matrix is given by Eq. (42).

$$\sum{}'^2 I = \begin{pmatrix} \int dx f(x - x_0)^2 & 0 & \frac{Al}{4}\int dx f(x - x_0)f''(x - x_0) \\ 0 & A^2\int dx f'(x - x_0)^2 & 0 \\ \frac{Al}{4}\int dx f(x - x_0)f''(x - x_0) & 0 & \frac{A^2 l^2}{16}\int dx f''(x - x_0)^2 \end{pmatrix} \qquad \text{(Equation 41)}$$

-continued $$I^{-1} = \frac{\sum'^2}{\mathrm{Var}[\hat{p}^2]_f} \begin{pmatrix} \int dx\,(f'')^2 & \frac{4}{IA}\int dx\,(f')^2 \\ \frac{4}{IA}\int dx\,(f')^2 & \left(\frac{4}{IA}\right)^2 \end{pmatrix}$$

(Equation 42)

In the above example, the notation introduced in Eq. (20) was used. When focusing on the range resolution parameter I, it is interesting to see the $(I^{-1})_{II}$ element of the inverse Fisher information matrix returns the same result that was derived in the deep-subwavelength limit, Eq. (14). Additionally, the noise power $\Sigma^2$ is effectively scaled by $A^2$, so$\Sigma'=A\Sigma$.

By applying Maximum Likelihood estimation to this multi-parameter estimation problem, instead of estimating the range resolution by discarding the total power in the pulse, the three parameters $\vec{\theta}=(A, x_0, l)^T$ are estimated separately. The estimators are found by considering the maximum likelihood $\partial \mathcal{L}/\partial\theta_j=0$, where the likelihood is given by Eq. (43).

$$\mathcal{L} = \frac{1}{2\sum'^2}\int dx\,\left(s(x) - \mu_{\vec{\theta}}(x)\right)^2$$

(Equation 43)

The maximization results in the equations $\int dx\,(x-\mu_{\vec{\theta}}(x))$ $f^{(n)}(x)=0$ for derivatives n=0, 1, 2. Replacing the resulting variables with their estimators $\hat{\theta}_j$, gives the optimal estimators and solving for the square range resolution results in Eq (44). For multiple repetitions, the data s(x) may be replaced by its statistical average at each position x. If the variance of $\hat{p}^2$ vanishes, this solution does not exist, which was anticipated previously and described above.

$$\frac{\hat{l}^2}{8} = \frac{1}{\mathrm{Var}[\hat{p}^2]_f}\left(\frac{\int dx\,s(x)f''(x)}{\int dx\,s(x)f(x)} + \int dx\,(f'(x))^2\right)$$

(Equation 44)

Experimental Implementation

Figure 10:
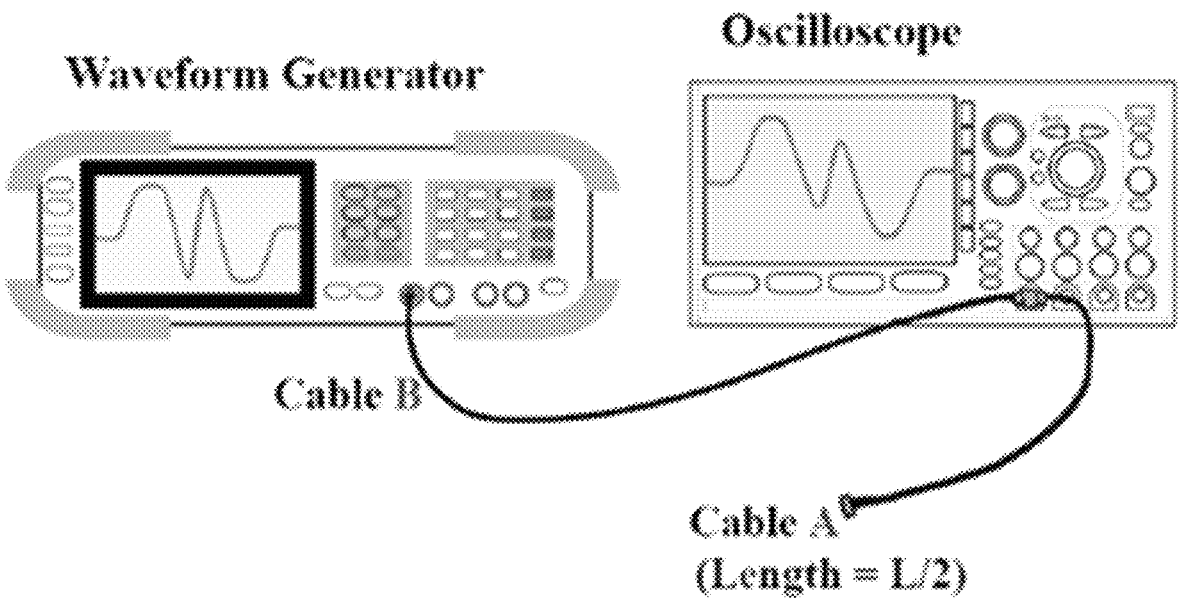
FIG. 10 illustrates a proof-of-concept experimental setup of the optimal pulse for two scatterers, according to an example of the present disclosure.

In an example, the specially-designed pulses S(t) (e.g., S(x)) from Eq. (22) and $f(t)$ from Eq. (26) may be put into an arbitrary waveform generator, which then outputs those waveforms into a 50Ω BNC cable network and is measured by an oscilloscope. FIG. 10 illustrates the schematic representation of the experimental apparatus. Specifically, FIG. 10 illustrates a proof-of-concept experimental setup of the optimal pulse for two scatterers where a waveform generator sends a constructed pulse into a double cable setup with the length of cable A being L/2. Upon exiting the waveform generator, the pulse travels through Cable B, which bifurcates at the T-junction, with a portion propagating through Cable A. Due to impedance mismatches, the partial pulse reflects at the open end of Cable A, traveling a round-trip length of L, where L/2 is the length of Cable A. In the particular BNC setup shown in FIG. 10, two pulses are generated. The objective of the experimental implementation is to investigate the resolvability in time (or space) by adjusting $V_\tau$ (the inverse bandedge) of the pulse while maintaining a constant length of L.

In the experiment, multiple pulses were collected from the oscilloscope across various pulse lengths for two distinct Cable A lengths: 30.5 cm and 61 cm, so the round-trip lengths L are 61 cm and 122 cm. The composite return pulse waveforms are of the type $c_0S(t)=c_1S(t+L/v)$, where $c_0$ and $c_1$ denote the respective amplitudes of the primary pulse and its reflection, and v the speed of the radio wave in the cable. In an example, a gradient descent method may be deployed to determine the optimal parameters for Cable A length (L) and pulse amplitudes ($c_0$ and $c_1$). In another example, a root mean square error ("RMSE") grid search method may be deployed to determine the optical parameters for Cable A length (L) and pulse amplitudes ($c_0$ and $c_1$). This iterative optimization technique utilized the collected pulse data alongside the base pulse waveform to iteratively refine the parameters (e.g., search through the parameter space until the best fitting parameters are found), thereby achieving the best fit for the observed pulses.

Figure 11:
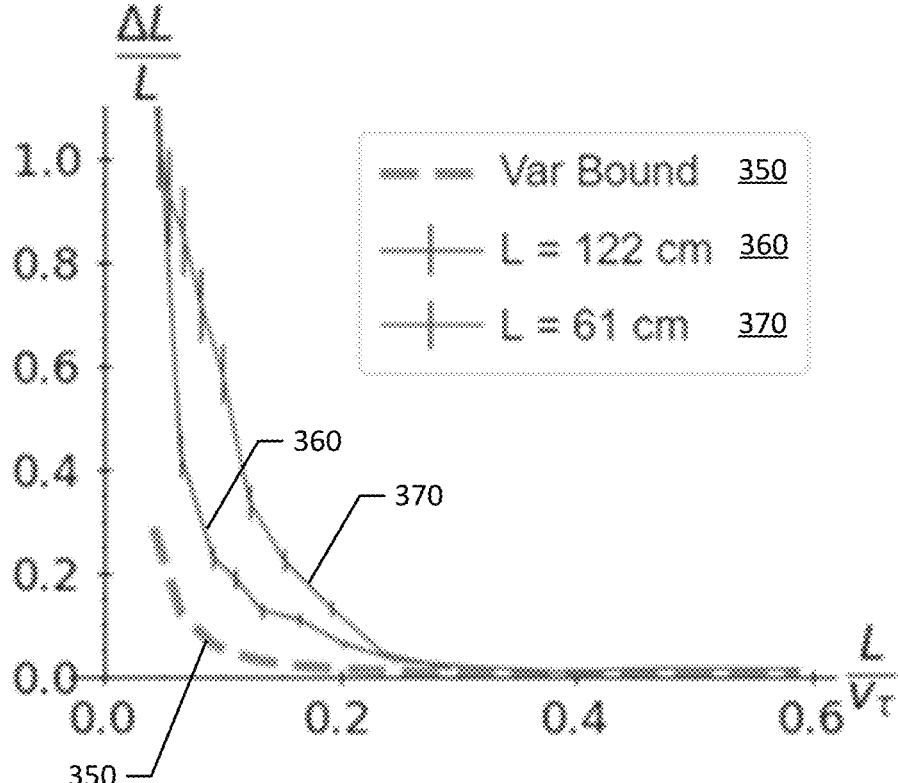
FIG. 11 illustrates a plot of the fractional uncertainty of the range resolution, according to an example of the present disclosure.
Figure 12:
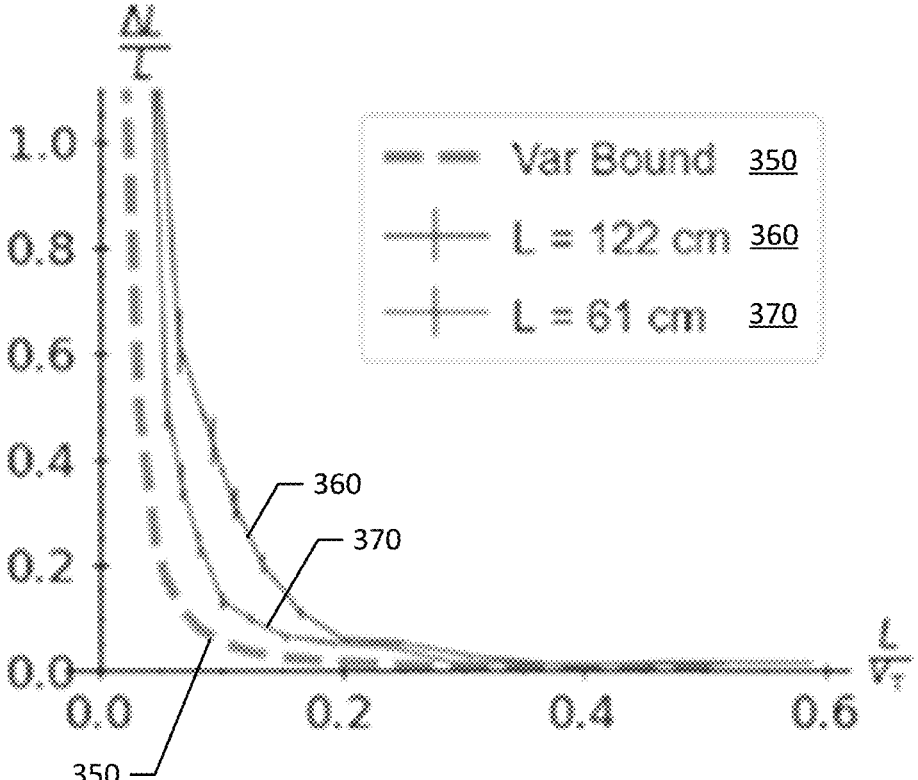
FIG. 12 illustrates a plot of the fractional uncertainty of the range resolution, according to an example of the present disclosure.

Considering the time-dependent pulses shown in FIGS. 5 and 8 and results shown in FIGS. 11 and 12. For example, referring back to FIGS. 5 and 8, the time-dependent functions S(t) and $f(t)$ are shown, respectively, while the measured fractional uncertainties $\Delta L/L$ against $L/V_\tau$ relative to the Fisher information are shown in FIGS. 11 and 12. Furthermore, in FIGS. 13 and 15, the time-dependent functions S(t) and $f(t)$ are shown, while the variance and mean of l are shown in FIGS. 14 and 16.

Specifically, FIG. 11 illustrates a plot of the fractional uncertainty of the range resolution $\Delta L/L$ is given versus $L/V_\tau$ for two L lengths (122 cm, 61 cm), where $V_\tau$ is the inverse bandedge of the sinc-enveloped optimal wave S(t) pulse with d=50. The dashed line shows the theoretical bound derived from the Cramer-Rao bound. Additionally, FIG. 12 illustrates a plot of the fractional uncertainty of the range resolution $\Delta L/L$ is shown versus $L/V_\tau$ for two L lengths (122 cm, 61 cm), where $V_\tau$ is the inverse bandedge of the spherical-Bessel function based $f(t)$ pulse with mode dimension N=12. The dashed line shows the theoretical bound derived from the Cramer-Rao bound.

The analysis facilitated the examination of the relationship between the relative error in Cable A length ($\Delta L/L$) and the normalized length-to-bandedge ratio ($L/V_\tau$) (see FIGS. 11 and 12) as well as the relationship between the variance in Cable A length (l/2) and the normalized length-to-bandedge ratio ($l/V_T$) (see FIGS. 13 to 16). Since $\Delta L/L$ is expressed as a percentage, the lower $\Delta L/L$ is, the better the resolvability of the relative range. The pulse $f(t)$ was closer to the Fisher information derived bound than the S(t) pulse, which likely results due to the more compact pulse arising from the spherical Bessel function method, which is not subject to long-time correlated noise. The findings illustrated above and described herein revealed that the resolvability of L is primarily influenced by the inverse bandwidth until $L/V_\tau\approx(0.2-0.3)$, depending on the pulse S(t) and $f(t)$. Beyond this threshold, the determination of L is predominantly hindered by additional noise present in the cables.

Figure 13:
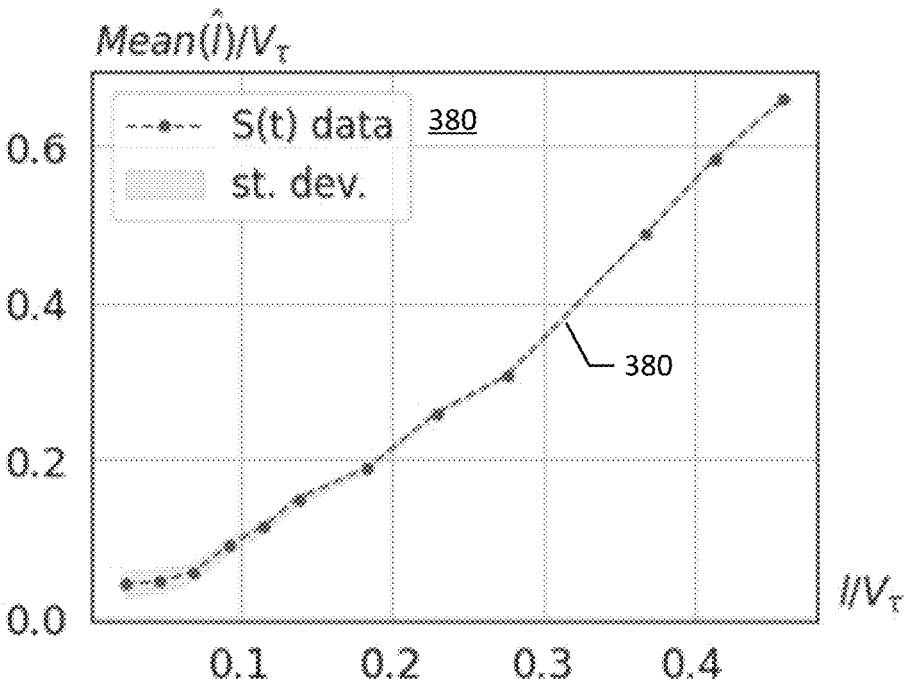
FIG. 13 illustrates a plot of the mean of the measured $\hat{l}/V\tau$ versus $l/V\tau$ for the function S(t), according to an example of the present disclosure.
Figure 14:
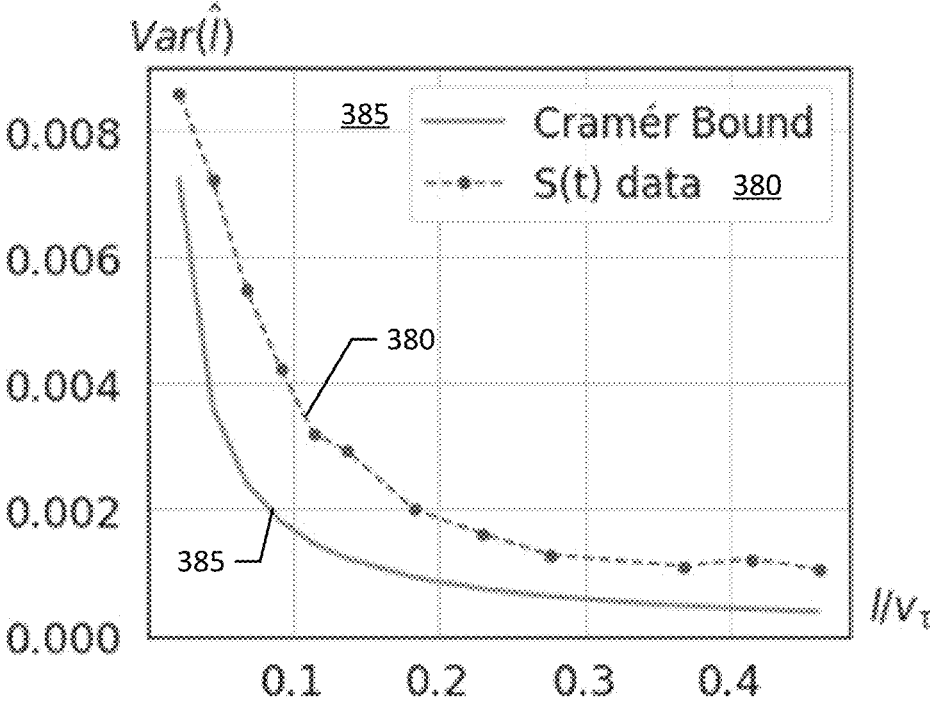
FIG. 14 illustrates a plot of the variance of the measured $\hat{l}$ versus $l/V\tau$ for the function S(t), according to an example of the present disclosure.

FIGS. 13 and 14 illustrate plots based on sinc-cosine function based S(t) pulse, where $V_T$ is the inverse bandedge of the sinc-cosine function based S(t) pulse with d=50. In the illustrated example, the true separation distance l is kept constant at 0.61 m, and $V_T$ is varied. The dashed-line in FIGS. 13 and 14 represents S(t) data 380. Additionally, the line plot in FIG. 14 shows the theoretical bound 385 derived from the Cramer-Rao lower bound.

Figure 15:
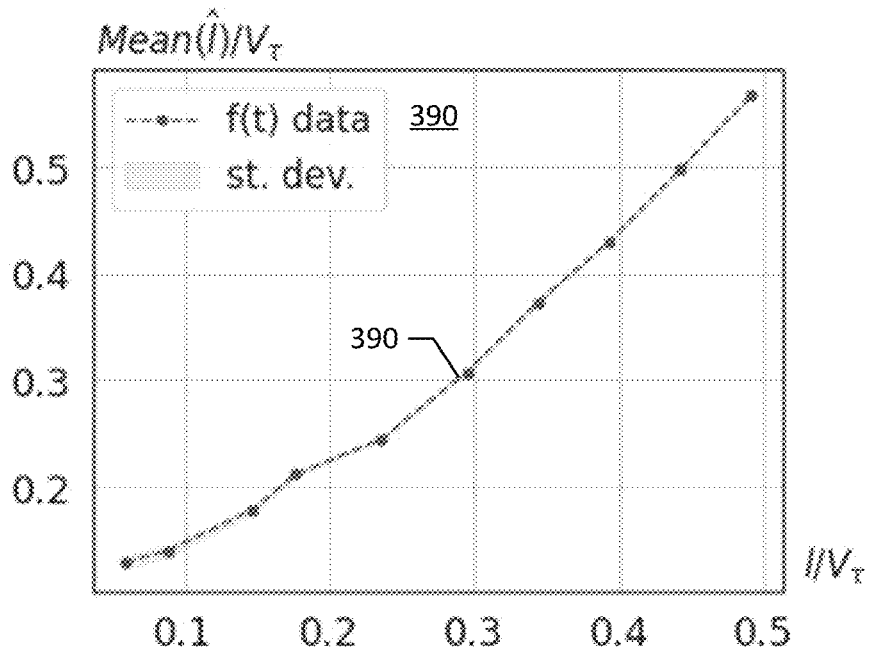
FIG. 15 illustrates a plot of the mean of the measured $\hat{l}/V\tau$ versus $l/V\tau$ for the function f(t), according to an example of the present disclosure.
Figure 16:
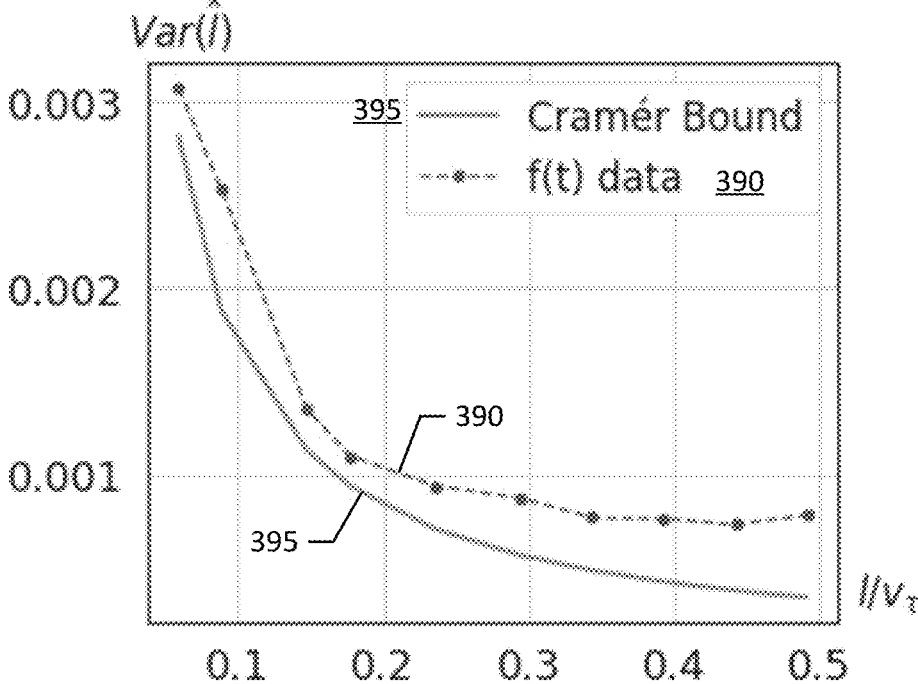
FIG. 16 illustrates a plot of the variance of the measured $\hat{l}$ versus $l/V\tau$ for the function f(t), according to an example of the present disclosure.

FIGS. 15 and 16 illustrate plots based on the spherical-Bessel function based $f$(t) pulse, where $V_T$ is the inverse bandedge of the spherical-Bessel function based $f$(t) pulse with mode dimension N=12. In the illustrated example, the true separation distance l is kept constant at 0.61 m, and $V_T$ is varied. The dashed-line in FIGS. 15 and 16 represents $f$(t) data 390. Additionally, the line plot in FIG. 16 shows the theoretical bound 395 derived from the Cramer-Rao lower bound.

Regarding FIGS. 14 and 16, which illustrates the variance of the measured $\hat{l}$ against the true separation $l/V_T$, compared to the Cramér-Rao bound. As noted above, the experimental analysis facilitated the examination of the relationship between the variance in Cable A length (l/2) and the normalized length-to-bandedge ratio ($l/V_T$). The lower the variance of the measured $\hat{l}$ is, the better the resolvability of the relative range. The pulse $f$(t) was closer to the Fisher information-derived bound than the S(t) pulse. As noted above, the results are likely due to the more compact pulse arising from the spherical Bessel function method, which is not subject to long-time correlated noise.

FIGS. 13 and 15 shows the mean of the measured $\hat{l}/V\tau$ versus $l/V\tau$, which was anticipated to be a direct 1:1 correlation. However, the plots shown in FIGS. 13 and 15 reveal that the measured $\hat{l}/V\tau$ is marginally greater than $l/V\tau$, thereby deviating more than the expected statistical uncertainty. The discrepancy however, may reveal systemic error, which may be attributed to the experimental setup of the BNC cables shown in FIG. 10, which does not conform perfectly to a two-scatterer model. Instead, there may be a series of small reflections from the T-junction to the cable's dead end, producing an infinite series of exponentially diminishing amplitude reflections. The above noted noise (e.g., amplitude reflections) may cause the model described herein to provide a systematically larger $\hat{l}$ value than the experimental reality, accounting for the mismatch between the mean and true value of the parameter.

Figure 17:
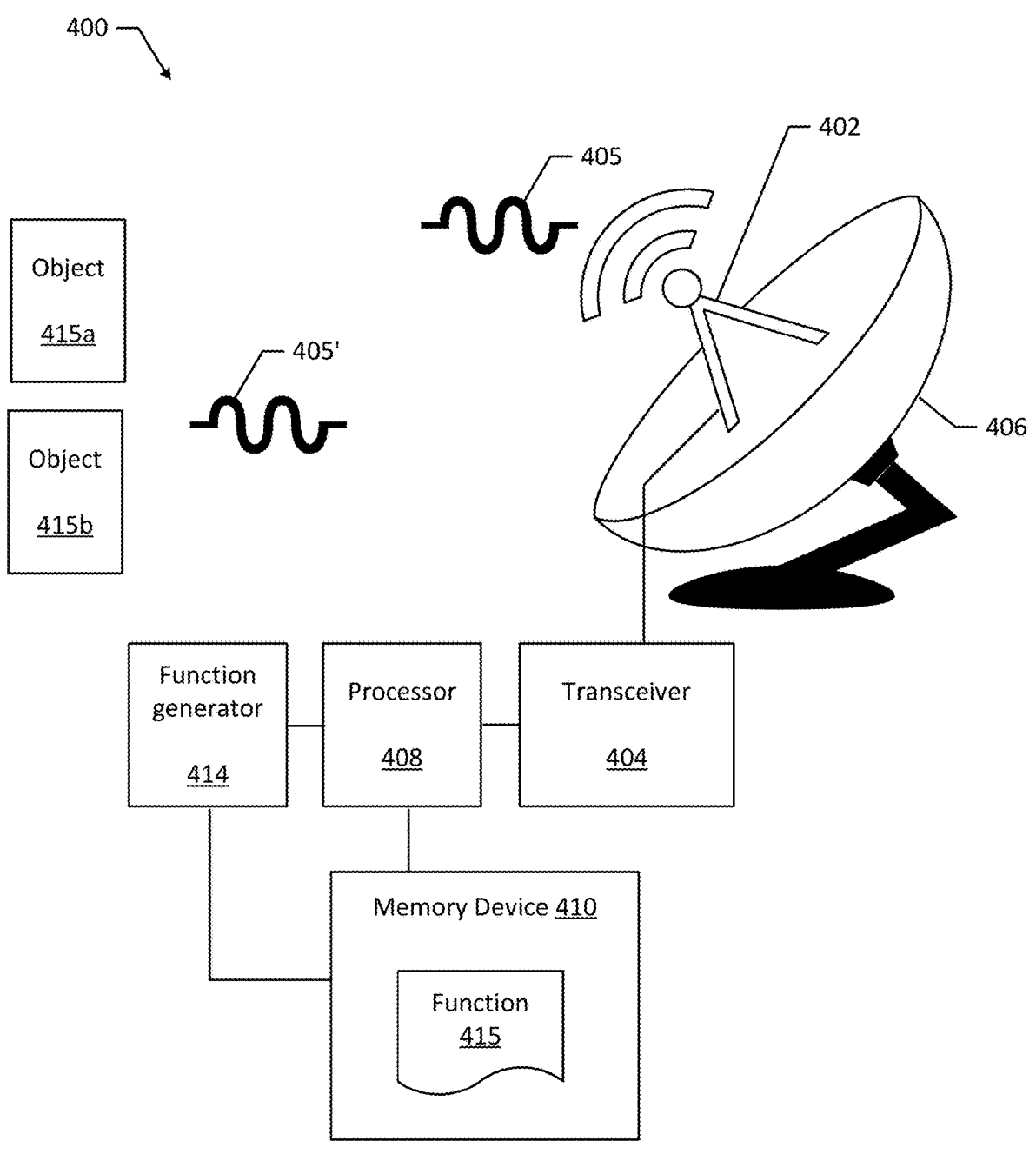
FIG. 17 illustrates a block diagram of an example interferometric range resolution apparatus, according to an example of the present disclosure.

FIG. 17 illustrates an example interferometric range resolution apparatus 400. The example interferometric range resolution apparatus 400 may include an antenna 402 and a transceiver 404 configured to transmit and receive wireless pulses 405. The interferometric range resolution apparatus 400 may also include a dish 406 configured to direct the received wireless pulses to the antenna. Additionally, the interferometric range resolution apparatus 400 may include a processor 408 electrically coupled to the antenna via the transceiver 404. In an example, the processor 408 is configured to provide range resolution of at least two objects (e.g., objects 415a and 415b) along a same line-of-sight of the transmitted wireless pulses 405. For example, the processor 408 may provide range resolution by selecting inter-ference-class pulses for transmission. In an example, the interference-class pulse may be formed using a function 415. The processor 408 may also cause the antenna 402 to transmit the interference-class pulses as the wireless pulses, After the reflected wireless pules 405' are received via the antenna 402, the processor 408 may be configured to use parameter estimation of the reflected wireless pulses 405' to determine at least one of a range of the at least two objects (e.g., objects 415a and 415b), a distance between the at least two objects, or relative scattering amplitudes related to the at least two objects.

The processor 408 may be a physical processor. As used herein physical processor or processor 408 refers to a device capable of executing instructions encoding arithmetic, logical, and/or input/output ("I/O") operations. In one illustra-tive example, a processor may follow a Von Neumann architectural model and may include an arithmetic logic unit ("ALU"), a control unit, and/or a plurality of registers. The processor 408 may be a single core processor which is typically capable of executing one instruction at a time (or process a single pipeline of instructions), or a multi-core processor which may simultaneously execute multiple instructions. The processor 408 may be implemented as a single integrated circuit, two or more integrated circuits, or may be a component of a multi-chip module (e.g., in which individual microprocessor dies are included in a single integrated circuit package and hence share a single socket). The processor 408 may also be referred to as a central processing unit (CPU).

The interferometric range resolution apparatus 400 may also include a memory device 410 and the function 415 may be stored within the memory device 410. In another example, the function 415 may be generated by the proces-sor 408 or a function generator 414, which may be a separate component communicatively coupled to the processor 408. In another example, the function generator 414 may form all or part of the processor 408. As used herein, a memory device (e.g., memory device 410 refers to a volatile or non-volatile memory device, such as random-access memory ("RAM"), read-only memory ("ROM"), electri-cally-erasable-programmable read-only memory ("EE-PROM"), or any other device capable of storing data. The interferometric range resolution apparatus 400 may also include one or more I/O devices, which refers to a device capable of providing an interface between one or more processor pins and an external device capable of inputting and/or outputting binary data.

In an example, the function 415 may include a first region and a second region. The first region of the function 415 may be configured to be sensitive to interference requiring extended and steep temporal gradients. Additionally, the second region of the function 415 may be configured to be a zero-gradient region that is insensitive to interference. The second region of the function 415 may also provide an amplitude reference.

Figure 18A:
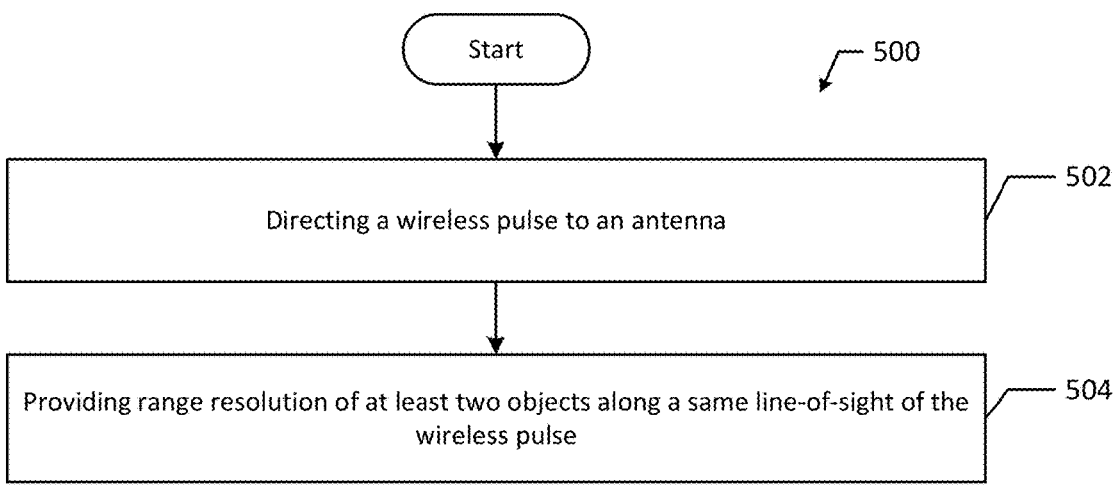
FIG. 18A illustrates a flowchart of an example process for interferometric range resolution, according to an example of the present disclosure.

FIG. 18A illustrates a flowchart of an example interfero-metric range resolution method 500 in accordance with an example of the present disclosure. Although the example method 500 is described with reference to the flowchart illustrated in FIG. 18A, it will be appreciated that many other methods of performing the acts associated with the method 500 may be used. For example, the order of some of the blocks may be changed, certain blocks may be combined with other blocks, and some of the blocks described may be optional. The method 500 may be performed by processing logic that may comprise hardware (circuitry, dedicated logic, etc.), software, or a combination of both.

The example method 500 includes directing a wireless pulse to an antenna (block 502). The method 500 also includes providing range resolution of at least two objects along a same line-of-sight of the wireless pulse (block 504). An example method and technique for providing range resolution is further described by example method 510, described in more detail below.

Figure 18B:
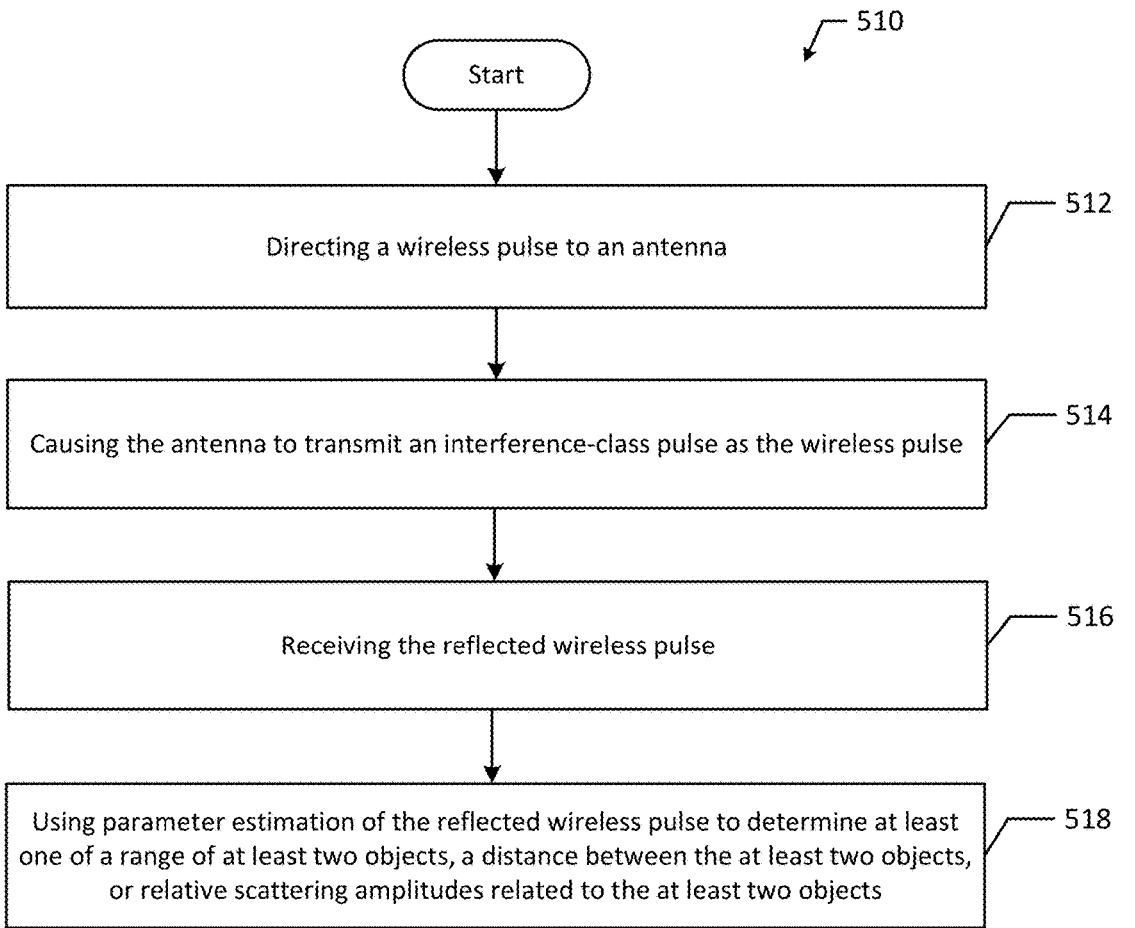
FIG. 18B illustrates a flowchart of an example process for interferometric range resolution, according to an example of the present disclosure.

FIG. 18B illustrates a flowchart of an example interfero-metric range resolution method 510 in accordance with an example of the present disclosure. Although the example method 510 is described with reference to the flowchart illustrated in FIG. 18B, it will be appreciated that many other methods of performing the acts associated with the method 510 may be used. For example, the order of some of the blocks may be changed, certain blocks may be combined with other blocks, and some of the blocks described may be optional. The method 510 may be performed by processing logic that may comprise hardware (circuitry, dedicated logic, etc.), software, or a combination of both.

The example method 510 includes directing a wireless pulse to an antenna (block 512). The method 510 also includes causing the antenna to transmit an interference-class pulse as the wireless pulse (block 514). The interference-class pulse may be formed using a function, such as an interference-class bandlimited pulse function, a triangle function, and a $sinc^2$ pulse function. Method 510 may also include receiving the reflected wireless pulse (block 516). For example, the reflected wireless pulse may be received by a dish, an antenna, a transceiver, or a combination thereof. The received wireless pulse or information related thereto may be sent to a processor for analysis and processing. For example, method 510 may also include using parameter estimation of the reflected wireless pulse to determine at least one of a range of at least two objects along the same line-of-sight of the wireless pulse, a distance between the at least two objects, or relative scattering amplitudes related to the at least two objects (block 518).

To recap, as discussed above, the optimal wave and waveform for the range resolution estimation problem was considered in a case of two scatters in a one-dimensional geometry. By optimizing the Fisher information of the range resolution parameter, explicit constructions for the optimal solution were identified, given the space of bandlimited functions with a fixed bandedge. In practice this bandedge is set by the constraints of the environment one is working in, such as the absorption behavior of water versus frequency. Additionally, the range resolution problem was examined from the point of view of multi-parameter estimation, where the total loss and timing information of the return pulse is also considered. The results described herein are consistent with the simplest single parameter results that were previously derived. While the description is mostly focused on equal strength parameters, the methodology and techniques described herein may be adapted to unequal strength reflectors as well as multiple reflectors.

The optimal pulses were implemented experimentally, using both the sinc-envelope optimal wave as the spherical Bessel function-based method with matched band edges. The experimental results showed robust super-radar range resolution. Both pulses are comparable in uncertainty to the theoretical limits set by the Cramer-Rao bound, but the spherical Bessel function method (in this instance) performs slightly better.

Unless otherwise indicated, all numbers expressing quantities, properties, conditions, and so forth used in the specification and claims are to be understood as being modified in all instances by the term "about." As used herein the terms "about" and "approximately" means within 10 to 15%, preferably within 5 to 10%. Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the systems, methods, apparatus and/or techniques of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. An interferometric range resolution apparatus comprising:

an antenna and a transceiver configured to transmit and receive wireless pulses;

a dish configured to direct the received wireless pulses to the antenna; and a processor electrically coupled to the antenna via the transceiver, the processor configured to provide range resolution of at least two objects along a same line-of-sight of the transmitted wireless pulses by:

selecting interference-class pulses for transmission, the interference-class pulse formed using a function, a first region of the function being configured to be sensitive to interference requiring extended and steep temporal gradients, and a second region of the function being configured to be a zero-gradient region that is insensitive to interference and provides an amplitude reference, causing the antenna to transmit the interference-class pulses as the wireless pulses, receiving reflected wireless pulses via the antenna, and using parameter estimation of the reflected wireless pulses to determine at least one of a range of the at least two objects, a distance between the at least two objects, or relative scattering amplitudes related to the at least two objects.

2. The interferometric range resolution apparatus of claim 1, wherein the reflected wireless pulses include multiple scattering depths along the same line-of-sight that result in the interference of temporally shifted versions of the transmitted wireless pulses.

3. The interferometric range resolution apparatus of claim 1, wherein a distance of the range resolution of the at least two objects is based on a pulse width.

4. The interferometric range resolution apparatus of claim 1, wherein using parameter estimation includes analyzing an interference between coherent pulses.

5. The interferometric range resolution apparatus of claim 1, wherein the function is at least one of an interference-class bandlimited pulse function, a triangle function, and a sinc$^2$ pulse function.

6. The interferometric range resolution apparatus of claim 5, wherein the interference-class bandlimited pulse function is generated from a band-limited canvas function and a polynomial function.

7. The interferometric range resolution apparatus of claim 5, wherein the triangle function is configured to amplitude-resolve the at least two objects when the at least two objects have depths that are closely spaced along the same line-of-sight.

8. The interferometric range resolution apparatus of claim 5, wherein the triangle function has an irregular spectrum.

9. The interferometric range resolution apparatus of claim 1, wherein the at least two objects includes a first object and a second object.

10. The interferometric range resolution apparatus of claim 9, wherein the first object is related to a first depth and the second object is related to a second depth of a two-depth target.

11. A method comprising:

directing a wireless pulse to an antenna; and providing range resolution of at least two objects along a same line-of-sight of the wireless pulse, wherein providing range resolution includes:

selecting an interference-class pulse for transmission, the interference-class pulse formed using a function, a first region of the function being configured to be sensitive to interference requiring extended and steep temporal gradients, and a second region of the function being configured to be a zero-gradient region that is insensitive to interference and provides an amplitude reference, causing the antenna to transmit the interference-class pulse as the wireless pulse, receiving a reflected wireless pulse via the antenna, and using parameter estimation of the reflected wireless pulse to determine at least one of a range of the at least two objects, a distance between the at least two objects, or relative scattering amplitudes related to the at least two objects.

12. The method of claim 11, wherein the reflected wireless pulse includes multiple scattering depths along the same line-of-sight that result in the interference of temporally shifted versions of the transmitted wireless pulse.

13. The method of claim 11, further comprising transmitting, by at least one of the antenna and a transceiver, the wireless pulse.

14. The method of claim 13, further comprising receiving, by at least one of the antenna and the transceiver, the wireless pulse.

15. The method of claim 11, wherein using parameter estimation includes analyzing an interference between coherent pulses.

16. The method of claim 11, further comprising generating the function.

17. The method of claim 16, wherein the function is at least one of an interference-class bandlimited pulse function, a triangle function, and a sinc$^2$ pulse function.

18. A non-transitory machine readable medium storing code, which when executed by a processor, is configured to:

direct a wireless pulse to an antenna; and provide range resolution of at least two objects along a same line-of-sight of the wireless pulse, wherein providing range resolution includes:

selecting an interference-class pulse for transmission, the interference-class pulse formed using a function, a first region of the function being configured to be sensitive to interference requiring extended and steep temporal gradients, and a second region of the function being configured to be a zero-gradient region that is insensitive to interference and provides an amplitude reference, causing the antenna to transmit the interference-class pulse as the wireless pulse, and using parameter estimation of a reflected wireless pulse received via the antenna to determine at least one of a range of the at least two objects, a distance between the at least two objects, or relative scattering amplitudes related to the at least two objects.

* * * * *